US012440907B2

(12) United States Patent
Dey, IV et al.

(10) Patent No.: US 12,440,907 B2
(45) Date of Patent: Oct. 14, 2025

(54) SYSTEMS AND METHODS FOR CONFIGURING A RECIPROCATING SAW

(71) Applicant: Milwaukee Electric Tool Corporation, Brookfield, WI (US)

(72) Inventors: John Stanley Dey, IV, Milwaukee, WI (US); Matthew J. Mergener, Mequon, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 472 days.

(21) Appl. No.: 17/820,746

(22) Filed: Aug. 18, 2022

(65) Prior Publication Data

US 2022/0395918 A1 Dec. 15, 2022

Related U.S. Application Data

(63) Continuation of application No. 16/728,605, filed on Dec. 27, 2019, now Pat. No. 11,433,466, which is a
(Continued)

(51) Int. Cl.
*B23D 51/16* (2006.01)
*B23D 59/00* (2006.01)
*B25F 5/00* (2006.01)

(52) U.S. Cl.
CPC ........... *B23D 51/16* (2013.01); *B23D 59/001* (2013.01); *B25F 5/00* (2013.01)

(58) Field of Classification Search
CPC ...... B23D 51/16; B23D 59/001; B23D 49/16; B25F 5/00; B25F 5/006; B23Q 15/0075;
(Continued)

(56) References Cited

U.S. PATENT DOCUMENTS 2,980,218 A 4/1961 Young
3,439,248 A 4/1969 Winchester et al.
(Continued)

FOREIGN PATENT DOCUMENTS

DE 10029132 A1 1/2002
DE 202006014606 U1 1/2007
(Continued)

OTHER PUBLICATIONS

International Search Report and Written Opinion for Application No. PCT2017/016210 dated May 1, 2017 (12 pages).
(Continued)

*Primary Examiner* — Ghassem Alie
(74) *Attorney, Agent, or Firm* — Michael Best & Friedrich LLP

(57) ABSTRACT

Systems and methods for configuring a power tool. One system includes a power tool communication system that includes an external device and a power tool. The external device includes a user interface configured to receive a first selection to enable a feature of a power tool, and receive a second selection of a threshold of a motor characteristic of the power tool. The power tool includes a motor within a housing. The power tool receives the selected feature and the selected threshold from the external device. The power tool includes a sensor configured to monitor the motor characteristic of the motor. The power tool further includes an electronic processor that controls the motor to operate according to the selected feature and adjusts an operating parameter of the motor when the motor characteristic is determined to cross the selected threshold.

14 Claims, 23 Drawing Sheets

Related U.S. Application Data continuation of application No. 15/423,105, filed on Feb. 2, 2017, now Pat. No. 10,562,116.

(60) Provisional application No. 62/290,808, filed on Feb. 3, 2016.

(58) Field of Classification Search
CPC ............. B23Q 17/0961; B23Q 1/0045; B25D 17/245; F16F 2222/06; G07C 9/00309; G07C 9/00007; E05B 17/22; G05B 19/4155; G05B 13/0265
USPC ................................................ 30/392; 83/63
See application file for complete search history.

(56) References Cited

U.S. PATENT DOCUMENTS

| | | |
|---|---|---|
| 3,619,750 A | 11/1971 | Mokrytzki |
| 3,739,659 A | 6/1973 | Workman, Jr. |
| 3,882,305 A | 5/1975 | Johnstone |
| 3,965,778 A | 6/1976 | Aspers et al. |
| 4,540,318 A | 9/1985 | Hornung et al. |
| 4,545,106 A | 10/1985 | Juengel |
| 4,628,459 A | 12/1986 | Shinohara et al. |
| 4,636,961 A | 1/1987 | Bauer |
| 4,680,862 A | 7/1987 | Wieland et al. |
| 4,685,050 A | 8/1987 | Polzer et al. |
| 4,707,793 A | 11/1987 | Anderson |
| 4,854,786 A | 8/1989 | Alexander et al. |
| 4,881,435 A | 11/1989 | Hansson |
| 4,893,067 A | 1/1990 | Bhagwat et al. |
| 4,903,187 A | 2/1990 | Doi et al. |
| 5,154,242 A | 10/1992 | Soshin et al. |
| 5,203,242 A | 4/1993 | Hansson |
| 5,277,261 A | 1/1994 | Sakoh |
| 5,315,501 A | 5/1994 | Whitehouse |
| 5,526,460 A | 6/1996 | DeFrancesco et al. |
| 5,558,476 A | 9/1996 | Uchida et al. |
| 5,572,916 A | 11/1996 | Takano |
| 5,602,347 A | 2/1997 | Matsubara et al. |
| 5,698,823 A | 12/1997 | Tanahashi |
| 5,731,673 A | 3/1998 | Gilmore |
| 5,731,681 A | 3/1998 | Inaniwa et al. |
| 5,819,202 A | 10/1998 | Sato et al. |
| 5,895,177 A | 4/1999 | Iwai et al. |
| 5,903,462 A | 5/1999 | Wagner et al. |
| 5,942,975 A | 8/1999 | Sørensen |
| 5,963,706 A | 10/1999 | Baik |
| 6,120,363 A | 9/2000 | Dunn |
| 6,123,241 A | 9/2000 | Walter et al. |
| 6,157,313 A | 12/2000 | Emmermann |
| 6,161,629 A | 12/2000 | Hohmann et al. |
| 6,218,633 B1 | 4/2001 | Okumura et al. |
| 6,279,668 B1 | 8/2001 | Mercer |
| 6,353,705 B1 | 3/2002 | Capps et al. |
| 6,405,598 B1 | 6/2002 | Bareggi |
| 6,424,799 B1 | 7/2002 | Gilmore |
| 6,431,425 B1 | 8/2002 | Moorman et al. |
| 6,438,446 B1 | 8/2002 | Trachier |
| 6,479,958 B1 | 11/2002 | Thompson et al. |
| 6,508,313 B1 | 1/2003 | Carney et al. |
| 6,520,270 B2 | 2/2003 | Wissmach et al. |
| 6,522,949 B1 | 2/2003 | Ikeda et al. |
| 6,536,536 B1 | 3/2003 | Gass et al. |
| 6,546,443 B1 | 4/2003 | Kushida |
| 6,598,684 B2 | 7/2003 | Watanabe |
| 6,636,011 B2 | 10/2003 | Sadasivam et al. |
| 6,668,212 B2 | 12/2003 | Colangelo, II et al. |
| 6,687,567 B2 | 2/2004 | Watanabe |
| 6,731,082 B2 | 5/2004 | Pelonis |
| 6,784,801 B2 | 8/2004 | Watanabe et al. |
| 6,810,589 B2 | 11/2004 | Lagaly et al. |
| 6,834,730 B2 | 12/2004 | Gass et al. |
| 6,836,614 B2 | 12/2004 | Gilmore |
| 6,848,516 B2 | 2/2005 | Giardino |
| 6,872,121 B2 | 3/2005 | Wiener et al. |
| 6,882,127 B2 | 4/2005 | Konigbauer |
| 6,913,087 B1 | 7/2005 | Brotto et al. |
| 6,923,285 B1 | 8/2005 | Rossow et al. |
| 6,938,689 B2 | 9/2005 | Farrant et al. |
| 6,945,337 B2 | 9/2005 | Kawai et al. |
| 6,954,048 B2 | 10/2005 | Cho |
| 6,968,908 B2 | 11/2005 | Tokunaga et al. |
| 6,978,846 B2 | 12/2005 | Kawai et al. |
| 7,034,711 B2 | 4/2006 | Sakatani et al. |
| 7,035,710 B2 | 4/2006 | Balling |
| 7,035,898 B1 | 4/2006 | Baker |
| 7,036,703 B2 | 5/2006 | Grazioli et al. |
| 7,062,998 B2 | 6/2006 | Hohmann et al. |
| 7,064,502 B2 | 6/2006 | Garcia et al. |
| 7,086,483 B2 | 8/2006 | Arimura et al. |
| 7,102,303 B2 | 9/2006 | Brotto et al. |
| 7,112,934 B2 | 9/2006 | Gilmore |
| 7,123,149 B2 | 10/2006 | Nowak et al. |
| 7,137,541 B2 | 11/2006 | Baskar et al. |
| 7,158,837 B2 | 1/2007 | Osypka et al. |
| 7,211,972 B2 | 5/2007 | Garcia et al. |
| 7,218,227 B2 | 5/2007 | Davis et al. |
| 7,243,440 B2 | 7/2007 | DeKeyser |
| 7,314,097 B2 | 1/2008 | Jenner et al. |
| 7,328,086 B2 | 2/2008 | Perry et al. |
| 7,328,752 B2 | 2/2008 | Gass et al. |
| 7,328,757 B2 | 2/2008 | Davies |
| 7,343,764 B2 | 3/2008 | Solfronk |
| 7,346,422 B2 | 3/2008 | Tsuchiya et al. |
| 7,359,762 B2 | 4/2008 | Etter et al. |
| 7,382,272 B2 | 6/2008 | Feight |
| 7,419,013 B2 | 9/2008 | Sainomoto et al. |
| 7,428,934 B2 | 9/2008 | Arimura |
| 7,437,204 B2 | 10/2008 | Lev-Ami et al. |
| 7,448,137 B2 | 11/2008 | Neitzell et al. |
| 7,464,769 B2 | 12/2008 | Nakazawa et al. |
| 7,501,778 B2 | 3/2009 | Hashimoto et al. |
| 7,518,837 B2 | 4/2009 | Tseng et al. |
| 7,540,334 B2 | 6/2009 | Gass et al. |
| 7,613,590 B2 | 11/2009 | Brown |
| 7,646,155 B2 | 1/2010 | Woods et al. |
| RE41,185 E | 3/2010 | Gilmore et al. |
| 7,681,659 B2 | 3/2010 | Zhang et al. |
| 7,690,569 B2 | 4/2010 | Swanson et al. |
| 7,728,553 B2 | 6/2010 | Carrier et al. |
| 7,750,811 B2 | 7/2010 | Puzio et al. |
| 7,787,981 B2 | 8/2010 | Austin et al. |
| 7,795,829 B2 | 9/2010 | Seiler et al. |
| 7,809,495 B2 | 10/2010 | Leufen |
| 7,817,062 B1 | 10/2010 | Li et al. |
| 7,823,458 B2 | 11/2010 | Kibblewhite et al. |
| 7,834,566 B2 | 11/2010 | Woods et al. |
| 7,868,591 B2 | 1/2011 | Phillips et al. |
| 7,898,403 B2 | 3/2011 | Ritter et al. |
| 7,900,524 B2 | 3/2011 | Calloway et al. |
| 7,911,379 B2 | 3/2011 | Cameron |
| 7,928,673 B2 | 4/2011 | Woods et al. |
| 7,931,096 B2 | 4/2011 | Saha |
| 7,942,084 B2 | 5/2011 | Wilson, Jr. et al. |
| 7,942,211 B2 | 5/2011 | Scrimshaw et al. |
| 7,953,965 B2 | 5/2011 | Qin et al. |
| 7,982,624 B2 | 7/2011 | Richter et al. |
| 8,004,397 B2 | 8/2011 | Forrest et al. |
| 8,004,664 B2 | 8/2011 | Etter et al. |
| 8,005,647 B2 | 8/2011 | Armstrong et al. |
| 8,022,654 B2 | 9/2011 | Zhao et al. |
| 8,044,796 B1 | 10/2011 | Carr, Sr. |
| 8,049,636 B2 | 11/2011 | Buckingham et al. |
| 8,074,731 B2 | 12/2011 | Iwata et al. |
| 8,169,298 B2 | 5/2012 | Wiesner et al. |
| 8,171,828 B2 | 5/2012 | Duvan et al. |
| 8,179,069 B2 | 5/2012 | Matsunaga et al. |
| 8,210,275 B2 | 7/2012 | Suzuki et al. |
| 8,255,358 B2 | 8/2012 | Ballew et al. |
| 8,260,452 B2 | 9/2012 | Austin et al. |
| 8,264,374 B2 | 9/2012 | Obatake et al. |
| 8,281,871 B2 | 10/2012 | Cutler et al. |
| 8,286,723 B2 | 10/2012 | Puzio et al. |

(56) References Cited

U.S. PATENT DOCUMENTS

| | | |
|---|---|---|
| 8,294,424 B2 | 10/2012 | Bucur |
| 8,310,206 B2 | 11/2012 | Bucur |
| 8,316,958 B2 | 11/2012 | Schell et al. |
| 8,324,845 B2 | 12/2012 | Suzuki et al. |
| 8,330,426 B2 | 12/2012 | Suzuki et al. |
| 8,351,982 B2 | 1/2013 | Rofougaran |
| 8,360,166 B2 | 1/2013 | Iimura et al. |
| 8,406,697 B2 | 3/2013 | Arimura et al. |
| 8,407,901 B2 | 4/2013 | Oberheim |
| 8,412,179 B2 | 4/2013 | Gerold et al. |
| 8,438,955 B2 | 5/2013 | Wilson, Jr. et al. |
| 8,461,785 B2 | 6/2013 | Sidhu |
| 8,464,808 B2 | 6/2013 | Leü |
| 8,564,236 B2 | 10/2013 | Hirabayashi et al. |
| 8,611,250 B2 | 12/2013 | Chen et al. |
| 8,627,900 B2 | 1/2014 | Oomori et al. |
| 8,645,176 B2 | 2/2014 | Walton et al. |
| 8,653,764 B2 | 2/2014 | Oberheim |
| 8,657,482 B2 | 2/2014 | Malackowski et al. |
| 8,666,936 B2 | 3/2014 | Wallace |
| 8,667,694 B2 | 3/2014 | Tokunaga et al. |
| 8,678,106 B2 | 3/2014 | Matsunaga et al. |
| 8,713,806 B2 | 5/2014 | Tokunaga et al. |
| 8,823,322 B2 | 9/2014 | Noda et al. |
| 8,826,548 B2 | 9/2014 | Kaiser et al. |
| 8,890,449 B2 | 11/2014 | Suzuki et al. |
| 8,919,456 B2 | 12/2014 | Ng et al. |
| 8,931,576 B2 | 1/2015 | Iwata et al. |
| 8,960,323 B2 | 2/2015 | Oberheim |
| 8,965,841 B2 | 2/2015 | Wallace |
| 8,981,680 B2 | 3/2015 | Suda et al. |
| 9,026,242 B2 | 5/2015 | Rivers et al. |
| 9,030,145 B2 | 5/2015 | Brennenstuhl et al. |
| 9,031,585 B2 | 5/2015 | Kahle et al. |
| 9,038,743 B2 | 5/2015 | Aoki |
| 9,061,392 B2 | 6/2015 | Forgues et al. |
| 9,073,134 B2 | 7/2015 | Koeder et al. |
| 9,114,519 B2 | 8/2015 | Iwata et al. |
| 9,126,317 B2 | 9/2015 | Lawton et al. |
| 9,144,875 B2 | 9/2015 | Schlesak et al. |
| 9,216,505 B2 | 12/2015 | Rejman et al. |
| 9,233,457 B2 | 1/2016 | Wanek et al. |
| 9,242,356 B2 | 1/2016 | King et al. |
| 9,281,770 B2 | 3/2016 | Wood et al. |
| 9,314,855 B2 | 4/2016 | Ookubo et al. |
| 9,314,908 B2 | 4/2016 | Tanimoto et al. |
| 9,466,198 B2 | 10/2016 | Burch et al. |
| 9,543,871 B2 | 1/2017 | Kato |
| 9,676,073 B2 | 6/2017 | Schubert et al. |
| 9,751,185 B2 | 9/2017 | Wolf et al. |
| 9,825,572 B2 | 11/2017 | Fujinami et al. |
| 9,866,153 B2 | 1/2018 | Kusakawa |
| 2001/0052416 A1 | 12/2001 | Wissmach et al. |
| 2002/0033267 A1 | 3/2002 | Schweizer et al. |
| 2002/0134811 A1 | 9/2002 | Napier et al. |
| 2003/0015979 A1 | 1/2003 | Karwath |
| 2003/0121677 A1 | 7/2003 | Watanabe et al. |
| 2003/0134189 A1 | 7/2003 | Kanai et al. |
| 2003/0163924 A1 | 9/2003 | Hempe et al. |
| 2004/0119431 A1 | 6/2004 | Kawano et al. |
| 2004/0182587 A1 | 9/2004 | May et al. |
| 2005/0031322 A1 | 2/2005 | Boyle et al. |
| 2005/0245182 A1 | 11/2005 | Deshpande et al. |
| 2006/0009879 A1 | 1/2006 | Lynch et al. |
| 2006/0076385 A1 | 4/2006 | Etter et al. |
| 2007/0252675 A1 | 11/2007 | Lamar |
| 2008/0084334 A1 | 4/2008 | Ballew |
| 2008/0086320 A1 | 4/2008 | Ballew |
| 2008/0086323 A1 | 4/2008 | Ballew et al. |
| 2008/0086349 A1 | 4/2008 | Petrie et al. |
| 2008/0086427 A1 | 4/2008 | Petrie |
| 2008/0086428 A1 | 4/2008 | Wallace |
| 2008/0086685 A1 | 4/2008 | Janky et al. |
| 2008/0152325 A1 | 6/2008 | Bae et al. |
| 2008/0302549 A1 | 12/2008 | Zeiler et al. |
| 2009/0077820 A1 | 3/2009 | Gibbons et al. |
| 2009/0211417 A1 | 8/2009 | Rummel et al. |
| 2009/0250364 A1 | 10/2009 | Gerold et al. |
| 2009/0251330 A1 | 10/2009 | Gerold et al. |
| 2009/0273436 A1 | 11/2009 | Gluck et al. |
| 2010/0089600 A1 | 4/2010 | Borinato et al. |
| 2010/0096151 A1 | 4/2010 | Östling |
| 2010/0116519 A1 | 5/2010 | Gareis |
| 2010/0154599 A1 | 6/2010 | Gareis |
| 2010/0175902 A1 | 7/2010 | Rejman et al. |
| 2010/0176766 A1 | 7/2010 | Brandner et al. |
| 2010/0229892 A1 | 9/2010 | Reese et al. |
| 2011/0056716 A1 | 3/2011 | Jönsson et al. |
| 2011/0067895 A1 | 3/2011 | Nobe et al. |
| 2011/0114347 A1 | 5/2011 | Kasuya et al. |
| 2011/0284255 A1 | 11/2011 | Ookubo et al. |
| 2011/0303427 A1 | 12/2011 | Tang |
| 2012/0167721 A1 | 7/2012 | Fluhrer |
| 2012/0168189 A1 | 7/2012 | Eckert |
| 2012/0199372 A1 | 8/2012 | Nishikawa et al. |
| 2012/0247796 A1 | 10/2012 | Mueller et al. |
| 2012/0279736 A1 | 11/2012 | Tanimoto et al. |
| 2012/0283851 A1 | 11/2012 | Yamamoto |
| 2012/0292070 A1 | 11/2012 | Ito et al. |
| 2013/0024245 A1 | 1/2013 | Nichols et al. |
| 2013/0062086 A1 | 3/2013 | Ito et al. |
| 2013/0076271 A1 | 3/2013 | Suda et al. |
| 2013/0087355 A1 | 4/2013 | Oomori et al. |
| 2013/0109375 A1 | 5/2013 | Zeiler et al. |
| 2013/0118767 A1 | 5/2013 | Cannaliato et al. |
| 2013/0126202 A1 | 5/2013 | Oomori et al. |
| 2013/0133907 A1 | 5/2013 | Chen et al. |
| 2013/0133911 A1 | 5/2013 | Ishikawa et al. |
| 2013/0138465 A1 | 5/2013 | Kahle et al. |
| 2013/0138606 A1 | 5/2013 | Kahle et al. |
| 2013/0153250 A1 | 6/2013 | Eckert |
| 2013/0187587 A1 | 7/2013 | Knight et al. |
| 2013/0188058 A1 | 7/2013 | Nguyen et al. |
| 2013/0189043 A1 | 7/2013 | Uchiuzo et al. |
| 2013/0191417 A1 | 7/2013 | Petrie et al. |
| 2013/0204753 A1 | 8/2013 | Wallace |
| 2013/0255980 A1 | 10/2013 | Linehan et al. |
| 2013/0278196 A1 | 10/2013 | Tian |
| 2013/0304545 A1 | 11/2013 | Ballew et al. |
| 2013/0327552 A1 | 12/2013 | Lovelass et al. |
| 2013/0333910 A1 | 12/2013 | Tanimoto et al. |
| 2014/0006295 A1 | 1/2014 | Zeiler et al. |
| 2014/0053419 A1 | 2/2014 | Leh et al. |
| 2014/0069672 A1 | 3/2014 | Mashiko et al. |
| 2014/0107471 A1 | 4/2014 | Haider et al. |
| 2014/0107853 A1 | 4/2014 | Ashinghurst et al. |
| 2014/0117892 A1 | 5/2014 | Coates |
| 2014/0122143 A1 | 5/2014 | Fletcher et al. |
| 2014/0151079 A1 | 6/2014 | Furui et al. |
| 2014/0159662 A1 | 6/2014 | Furui et al. |
| 2014/0159919 A1 | 6/2014 | Furui et al. |
| 2014/0159920 A1 | 6/2014 | Furui et al. |
| 2014/0166324 A1 | 6/2014 | Puzio et al. |
| 2014/0184397 A1 | 7/2014 | Volpert |
| 2014/0236159 A1 | 8/2014 | Haider et al. |
| 2014/0240125 A1 | 8/2014 | Burch et al. |
| 2014/0245620 A1 | 9/2014 | Fankhauser et al. |
| 2014/0284070 A1 | 9/2014 | Ng et al. |
| 2014/0292245 A1 | 10/2014 | Suzuki et al. |
| 2014/0324194 A1 | 10/2014 | Larsson et al. |
| 2014/0331830 A1 | 11/2014 | King et al. |
| 2014/0334270 A1 | 11/2014 | Kusakawa |
| 2014/0336810 A1 | 11/2014 | Li et al. |
| 2014/0336955 A1 | 11/2014 | Li et al. |
| 2014/0350716 A1 | 11/2014 | Fly et al. |
| 2014/0352995 A1 | 12/2014 | Matsunaga et al. |
| 2014/0365259 A1 | 12/2014 | Delplace et al. |
| 2014/0367134 A1 | 12/2014 | Phillips et al. |
| 2014/0379136 A1 | 12/2014 | Schlegel et al. |
| 2015/0000944 A1 | 1/2015 | Dusselberg et al. |
| 2015/0002089 A1 | 1/2015 | Rejman et al. |
| 2015/0042247 A1 | 2/2015 | Kusakawa |
| 2015/0090086 A1 | 4/2015 | Winkler et al. |
| 2015/0122520 A1 | 5/2015 | Rola et al. |

(56) References Cited

U.S. PATENT DOCUMENTS

| | | |
|---|---|---|
| 2015/0122524 A1 | 5/2015 | Papp |
| 2015/0135306 A1 | 5/2015 | Winkler et al. |
| 2015/0135907 A1 | 5/2015 | Hirabayashi et al. |
| 2015/0137721 A1 | 5/2015 | Yamamoto et al. |
| 2015/0141999 A1 | 5/2015 | McGinley et al. |
| 2015/0148805 A1 | 5/2015 | McGinley et al. |
| 2015/0148806 A1 | 5/2015 | McGinley et al. |
| 2015/0158157 A1 | 6/2015 | Hirabayashi et al. |
| 2015/0158170 A1 | 6/2015 | Nitsche et al. |
| 2015/0171654 A1 | 6/2015 | Horie et al. |
| 2015/0309640 A1 | 10/2015 | Vuckovic |
| 2015/0328736 A1 | 11/2015 | Klotz et al. |
| 2015/0340921 A1 | 11/2015 | Suda et al. |
| 2016/0022374 A1 | 1/2016 | Haider et al. |
| 2016/0129578 A1 | 5/2016 | Sprenger et al. |
| 2016/0151845 A1 | 6/2016 | Yamamoto et al. |
| 2016/0167186 A1 | 6/2016 | Chan et al. |
| 2016/0193673 A1 | 7/2016 | Yoshida et al. |
| 2017/0008159 A1 | 1/2017 | Boeck et al. |
| 2017/0093321 A1 | 3/2017 | Ichikawa |
| 2017/0170774 A1* | 6/2017 | Selfors ............... B24B 23/028 |
| 2017/0364055 A1 | 12/2017 | Asahara |

FOREIGN PATENT DOCUMENTS

| | | |
|---|---|---|
| EP | 0018465 A1 | 11/1980 |
| EP | 0716492 A1 | 12/1996 |
| EP | 1209805 A1 | 5/2002 |
| EP | 2147750 A1 | 1/2010 |
| EP | 2631036 A2 | 8/2013 |
| GB | 2438877 A | 12/2007 |
| JP | S63176075 U | 11/1988 |
| JP | H08141928 A | 6/1996 |
| JP | H08290312 A | 11/1996 |
| JP | H11164579 A | 6/1999 |
| JP | 2000176850 A | 6/2000 |
| JP | 2004072563 A | 3/2004 |
| JP | 2004255542 A | 9/2004 |
| JP | 2004322262 A | 11/2004 |
| JP | 2006123080 A | 5/2006 |
| JP | 4359018 B2 | 11/2009 |
| JP | 2009297807 A | 12/2009 |
| JP | 2010110875 A | 5/2010 |
| JP | 2015035843 A | 2/2015 |
| WO | WO0230624 A2 | 4/2002 |
| WO | WO2007083447 A1 | 7/2007 |
| WO | WO2007090258 A1 | 8/2007 |
| WO | WO2007141578 A2 | 12/2007 |
| WO | WO2008096681 A1 | 8/2008 |
| WO | WO2013116303 A1 | 8/2013 |
| WO | WO2013140675 A1 | 9/2013 |
| WO | WO2014022881 A1 | 2/2014 |
| WO | WO2014144780 A1 | 9/2014 |
| WO | WO2015061370 A1 | 4/2015 |

OTHER PUBLICATIONS

Australian Patent Office Action for Application No. 2017213819 dated Jul. 5, 2019 (3 pages).
Japanese Patent Office Action for Application No. 2018-540053 dated Jun. 4, 2019 (6 pages including English translation).
Korean Patent Office Action for Application No. 10-2018-7024325 dated Aug. 20, 2019 (English translation, 6 pages).
European Patent Office Extended Search Report for Application No. 17748151.2 dated Feb. 14, 2020 (9 pages).
Chinese Patent Office First Office Action for Application No. 201780009905.7 dated Mar. 13, 2020 (12 pages including statement of relevance).
Examination Report No. 1 issued by the Australian Government for Application No. 2020200319 dated Dec. 11, 2020 (10 pages).
Second Office Action issued by the Chinese Patent Office for Application No. 201780009905.7 dated Dec. 10, 2020 (5 pages including statement of relevance).
Extended European Search Report for Application No. 21187613.1 dated Nov. 5, 2021 (8 pages).

* cited by examiner

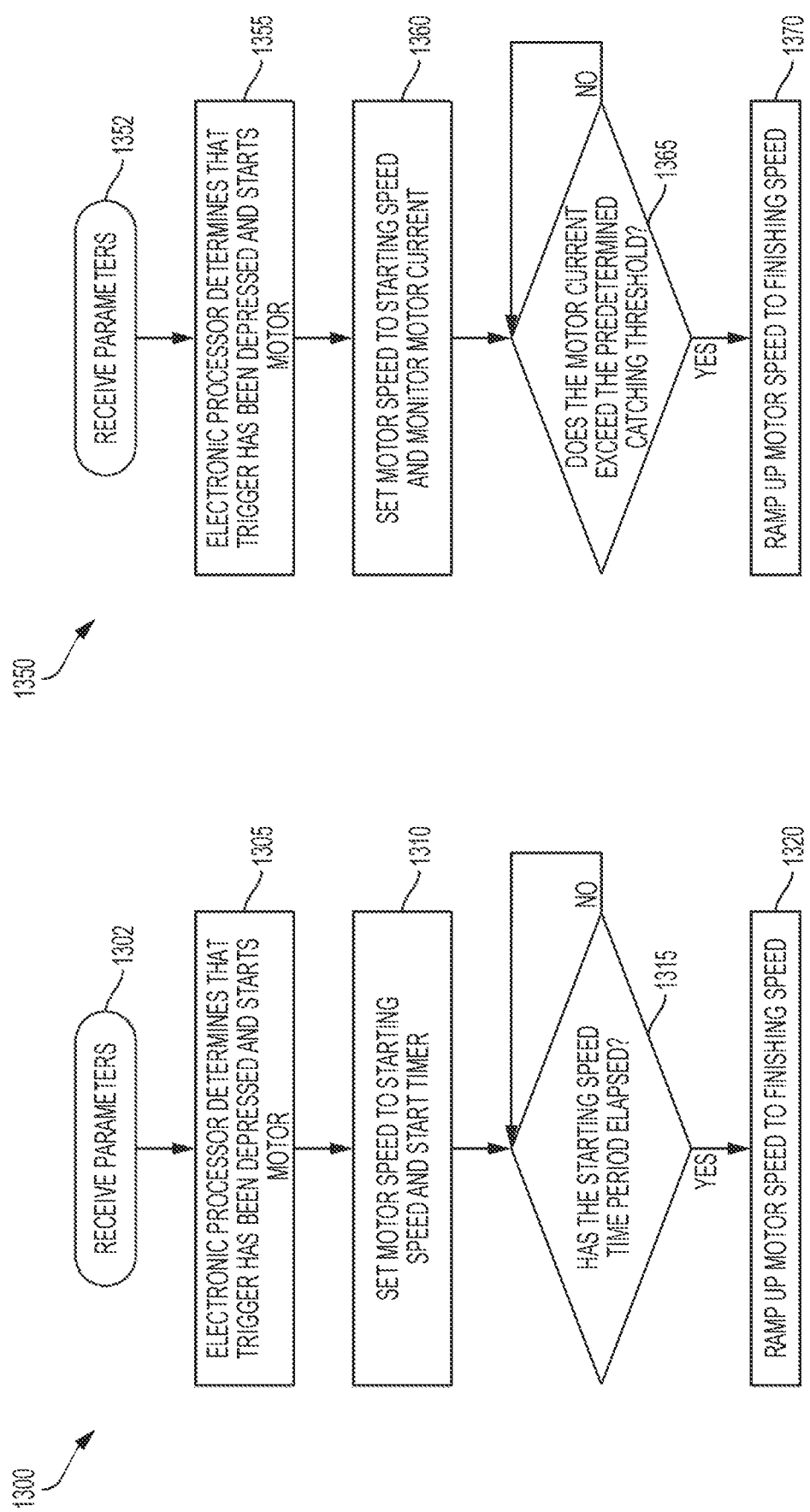

SYSTEMS AND METHODS FOR CONFIGURING A RECIPROCATING SAW

RELATED APPLICATIONS

This application is a continuation of U.S. patent application Ser. No. 16/728,605, filed on Dec. 27, 2019, which is a continuation of U.S. patent application Ser. No. 15/423,105, filed Feb. 2, 2017, now U.S. Pat. No. 10,562,116, which claims priority to U.S. Provisional Patent Application No. 62/290,808 filed on Feb. 3, 2016, the entire contents of all of which are hereby incorporated by reference.

FIELD OF THE INVENTION

The present invention relates to power tools that communicate with an external device.

SUMMARY

In one embodiment, a power tool including a housing is provided. The power tool includes a motor within the housing, and the motor includes a rotor and a stator. The power tool further includes a transmission coupled between the motor and a reciprocating spindle. The transmission converts rotational motion of the motor to reciprocating motion of the reciprocating spindle. The power tool further includes a blade holder coupled to the reciprocating spindle, and a sensor configured to monitor a motor current. The power tool further includes an electronic processor coupled to the sensor. The electronic processor starts driving the motor in response to determining that a trigger has been depressed. The electronic processor also determines when an item is being cut based on the motor current, and determines when the item is no longer being cut based on the motor current. The electronic processor ceases driving the motor in response to determining that the item is no longer being cut.

In another embodiment, a power tool including a housing is provided. The power tool includes a motor within the housing, and the motor includes a rotor and a stator. The power tool further includes a transmission coupled between the motor and a reciprocating spindle. The transmission converts rotational motion of the motor to reciprocating motion of the reciprocating spindle. The power tool further includes a blade holder coupled to the reciprocating spindle, and a sensor configured to monitor a motor current. The power tool further includes an electronic processor coupled to the sensor. The electronic processor starts driving the motor in response to determining that a trigger has been depressed. The electronic processor also determines when a first material is being cut based on the motor current. While the first material is being cut, the electronic processor determines a motor current acceleration based on the motor current. The electronic processor also determines when a second material is being cut based on the motor current acceleration, and ceases driving the motor in response to determining that the second material is being cut.

In one embodiment, a power tool communication system including an external device and a power tool is provided. The external device includes a user interface configured to receive a first selection of a type of material to be cut, receive a second selection of a thickness of a material to be cut, and receive a third selection of a blade type of a blade to be used to cut the material. The external device further includes a first electronic processor configured to control the user interface to display a recommended motor speed based on at least one of the group consisting of the selected blade type, the selected type of material, and the selected thickness of the material. The power tool includes a housing and a motor within the housing. The motor includes a rotor and a stator. The power tool further includes a transmission coupled between the motor and a reciprocating spindle. The transmission converts rotational motion of the motor to reciprocating motion of the reciprocating spindle. The power tool further includes a blade holder coupled to the reciprocating spindle. The power tool further includes a wireless communication controller that receives the recommended motor speed from the external device. The power tool further includes a second electronic processor coupled to the wireless communication controller. The second electronic processor controls the motor to operate at the recommended motor speed.

In another embodiment, a power tool communication system including an external device and a power tool is provided. The external device includes a user interface configured to receive a first selection of a first speed of a motor of a power tool, and receive a second selection of a second speed of the motor of the power tool. The user interface is further configured to receive a third selection of a characteristic to be monitored to cause a speed of the motor to be adjusted from the first speed to the second speed, and receive a fourth selection of a threshold of the selected characteristic to be monitored. The power tool includes a housing and a motor within the housing. The motor includes a rotor and a stator. The power tool further includes a transmission coupled between the motor and a reciprocating spindle. The transmission converts rotational motion of the motor to reciprocating motion of the reciprocating spindle. The power tool further includes a blade holder coupled to the reciprocating spindle. The power tool further includes a wireless communication controller that receives the selected first speed, the selected second speed, the selected characteristic to be monitored, and the selected threshold from the external device. The power tool further includes a sensor configured to monitor the selected characteristic, and an electronic processor coupled to the sensor and to the wireless communication controller. The electronic processor starts driving the motor in response to determining that a trigger has been depressed, and sets a motor speed to the first speed. The electronic processor also determines whether the selected characteristic has crossed the selected threshold, and increases the motor speed from the first speed to the second speed in response to determining that the selected characteristic has crossed the selected threshold.

In one embodiment, a method of configuring a power tool is provided. The method includes starting to drive a motor, with an electronic processor, in response to determining that a trigger has been depressed. The motor includes a rotor and a stator and is located within a housing of the power tool. The motor is coupled to a transmission that is coupled to a reciprocating spindle and that converts rotational motion of the motor to reciprocating motion of the reciprocating spindle. The reciprocating spindle is coupled to a blade holder. The method further includes monitoring, with a sensor coupled to the electronic processor, a motor current. The method further includes determining, with the electronic processor, when an item is being cut based on the motor current. The method further includes determining, with the electronic processor, when the item is no longer being cut based on the motor current. The method further includes ceasing driving of the motor, with the electronic processor, in response to determining that the item is no longer being cut.

In another embodiment, a method of configuring a power tool is provided. The method includes starting to drive a motor, with an electronic processor, in response to determining that a trigger has been depressed. The motor includes a rotor and a stator and is located within a housing of the power tool. The motor is coupled to a transmission that is coupled to a reciprocating spindle and that converts rotational motion of the motor to reciprocating motion of the reciprocating spindle. The reciprocating spindle is coupled to a blade holder. The method further includes monitoring, with a sensor coupled to the electronic processor, a motor current. The method further includes determining, with the electronic processor, when a first material is being cut based on the motor current. The method further includes determining, with the electronic processor while the first material is being cut, a motor current acceleration based on the motor current. The method further includes determining, with the electronic processor, when a second material is being cut based on the motor current acceleration. The method further includes ceasing driving of the motor, with the electronic processor, in response to determining that the second material is being cut.

In another embodiment, a method of configuring a power tool is provided. The method includes receiving, by a user interface of an external device, a first selection of a type of material to be cut. The method further includes receiving, by the user interface of the external device, a second selection of a thickness of a material to be cut. The method further includes receiving, by the user interface of the external device, a third selection of a blade type of a blade to be used to cut the material. The method further includes determining, with a first electronic processor of the external device, a recommended motor speed based on at least one of the group consisting of the selected blade type, the selected type of material, and the selected thickness of the material. The method further includes displaying, with the user interface of the of the external device, the recommended motor speed. The method further includes receiving, with a wireless communication controller of the power tool, the recommended motor speed from the external device, the power tool including a motor. The motor includes a rotor and a stator and is located within a housing of the power tool. The motor is coupled to a transmission that is coupled to a reciprocating spindle and that converts rotational motion of the motor to reciprocating motion of the reciprocating spindle. The reciprocating spindle is coupled to a blade holder. The method further includes controlling, with a second electronic processor of the power tool, the motor to operate at the recommended motor speed. The second electronic processor is coupled to the wireless communication controller.

In another embodiment, a method of configuring a power tool is provided. The method includes receiving, by a user interface of an external device, a first selection of a first speed of a motor of a power tool. The method further includes receiving, by the user interface of the external device, a second selection of a second speed of the motor of the power tool. The method further includes receiving, by the user interface of the external device, a third selection of a characteristic to be monitored to cause a speed of the motor to be adjusted from the first speed to the second speed. The method further includes receiving, by the user interface of the external device, a fourth selection of a threshold of the selected characteristic to be monitored. The method further includes receiving, with a wireless communication controller of the power tool, the selected first speed, the selected second speed, the selected characteristic to be monitored, and the selected threshold from the external device, the power tool including a motor. The motor includes a rotor and a stator and is located within a housing of the power tool. The motor is coupled to a transmission that is coupled to a reciprocating spindle and that converts rotational motion of the motor to reciprocating motion of the reciprocating spindle. The reciprocating spindle is coupled to a blade holder. The method further includes starting to drive a motor, with an electronic processor of the power tool, in response to determining that a trigger has been depressed. The method further includes setting, with the electronic processor of the power tool, a motor speed to the first speed. The method further includes monitoring, with a sensor coupled to the electronic processor, the selected characteristic. The method further includes determining, with the electronic processor of the power tool, whether the selected characteristic has crossed the selected threshold. The method further includes increasing, with the electronic processor of the power tool, the motor speed from the first speed to the second speed in response to determining that the selected characteristic has crossed the selected threshold.

In one embodiment, a power tool communication system is provided that includes an external device and a power tool. The external device includes a user interface configured to receive a first selection to enable a feature of a power tool, and receive a second selection of a threshold of a motor characteristic of the power tool. The external device further includes a first wireless communication controller configured to transmit the selected feature and the selected threshold to the power tool. The power tool includes a housing and a motor within the housing. The motor includes a rotor and a stator. A drive mechanism is coupled between the motor and a reciprocating spindle. The drive mechanism converts rotational motion of the motor to reciprocating motion of the reciprocating spindle. The power tool further includes a blade holder coupled to the reciprocating spindle. The power tool further includes a second wireless communication controller configured to receive the selected feature of the power tool and the selected threshold from the first wireless communication controller. The power tool further includes a sensor configured to monitor the motor characteristic of the motor. The power tool further includes an electronic processor coupled to the sensor and to the second wireless communication controller. The electronic processor controls the motor to operate according to the selected feature and adjusts an operating parameter of the motor when the motor characteristic is determined to cross the selected threshold.

BRIEF DESCRIPTION OF THE DRAWINGS

FIGS. 13A and 13B illustrate flowcharts of exemplary implementations of a plunge cutting profile on the power tool.

DETAILED DESCRIPTION

Figure 1:
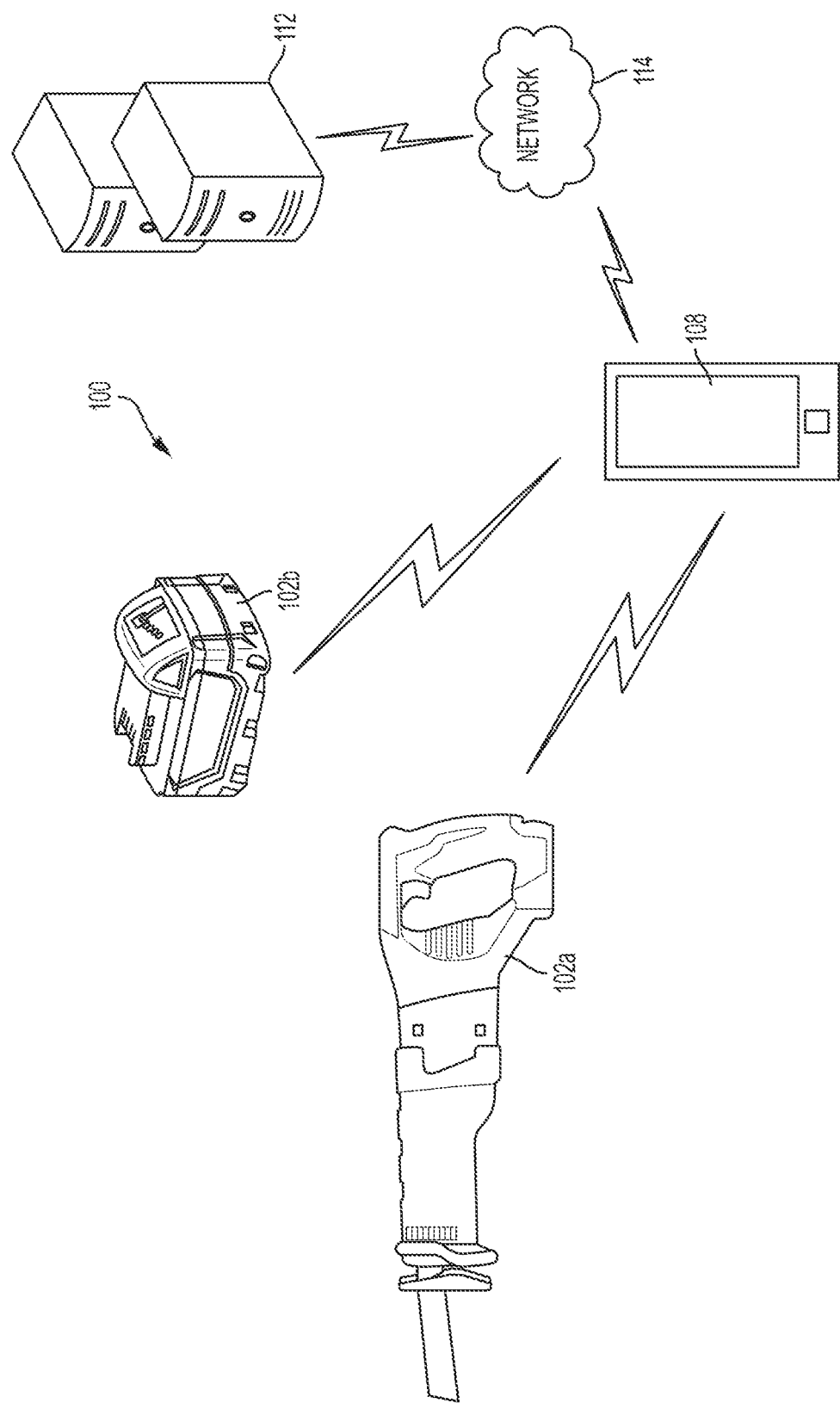
FIG. 1 illustrates a communication system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates a communication system 100. The communication system 100 includes power tool devices 102 and an external device 108. Each power tool device 102 (e.g., reciprocating saw 102a and power tool battery pack 102b) and the external device 108 can communicate wirelessly while they are within a communication range of each other. Each power tool device 102 may communicate power tool status, power tool operation statistics, power tool identification, stored power tool usage information, power tool maintenance data, and the like. Therefore, using the external device 108, a user can access stored power tool usage or power tool maintenance data. With this tool data, a user can determine how the power tool device 102 has been used, whether maintenance is recommended or has been performed in the past, and identify malfunctioning components or other reasons for certain performance issues. The external device 108 can also transmit data to the power tool device 102 for power tool configuration, firmware updates, or to send commands (e.g., turn on a work light). The external device 108 also allows a user to set operational parameters, safety parameters, select tool modes, and the like for the power tool device 102.

The external device 108 may be, for example, a smart phone (as illustrated), a laptop computer, a tablet computer, a personal digital assistant (PDA), or another electronic device capable of communicating wirelessly with the power tool device 102 and providing a user interface. The external device 108 provides the user interface and allows a user to access and interact with tool information. The external device 108 can receive user inputs to determine operational parameters, enable or disable features, and the like. The user interface of the external device 108 provides an easy-to-use interface for the user to control and customize operation of the power tool.

The external device 108 includes a communication interface that is compatible with a wireless communication interface or module of the power tool device 102. The communication interface of the external device 108 may include a wireless communication controller (e.g., a Bluetooth® module), or a similar component. The external device 108, therefore, grants the user access to data related to the power tool device 102, and provides a user interface such that the user can interact with the controller of the power tool device 102.

In addition, as shown in FIG. 1, the external device 108 can also share the information obtained from the power tool device 102 with a remote server 112 connected by a network 114. The remote server 112 may be used to store the data obtained from the external device 108, provide additional functionality and services to the user, or a combination thereof. In one embodiment, storing the information on the remote server 112 allows a user to access the information from a plurality of different locations. In another embodiment, the remote server 112 may collect information from various users regarding their power tool devices and provide statistics or statistical measures to the user based on information obtained from the different power tools. For example, the remote server 112 may provide statistics regarding the experienced efficiency of the power tool device 102, typical usage of the power tool device 102, and other relevant characteristics and/or measures of the power tool device 102. The network 114 may include various networking elements (routers, hubs, switches, cellular towers, wired connections, wireless connections, etc.) for connecting to, for example, the Internet, a cellular data network, a local network, or a combination thereof. In some embodiments, the power tool device 102 may be configured to communicate directly with the server 112 through an additional wireless interface or with the same wireless interface that the power tool device 102 uses to communicate with the external device 108.

The power tool device 102 is configured to perform one or more specific tasks (e.g., drilling, cutting, fastening, pressing, lubricant application, sanding, heating, grinding, bending, forming, impacting, polishing, lighting, etc.). For example, an impact wrench is associated with the task of generating a rotational output (e.g., to drive a bit) while a reciprocating saw is associated with the task of generating a reciprocating output motion (e.g., for pushing and pulling a saw blade).

Figure 2:
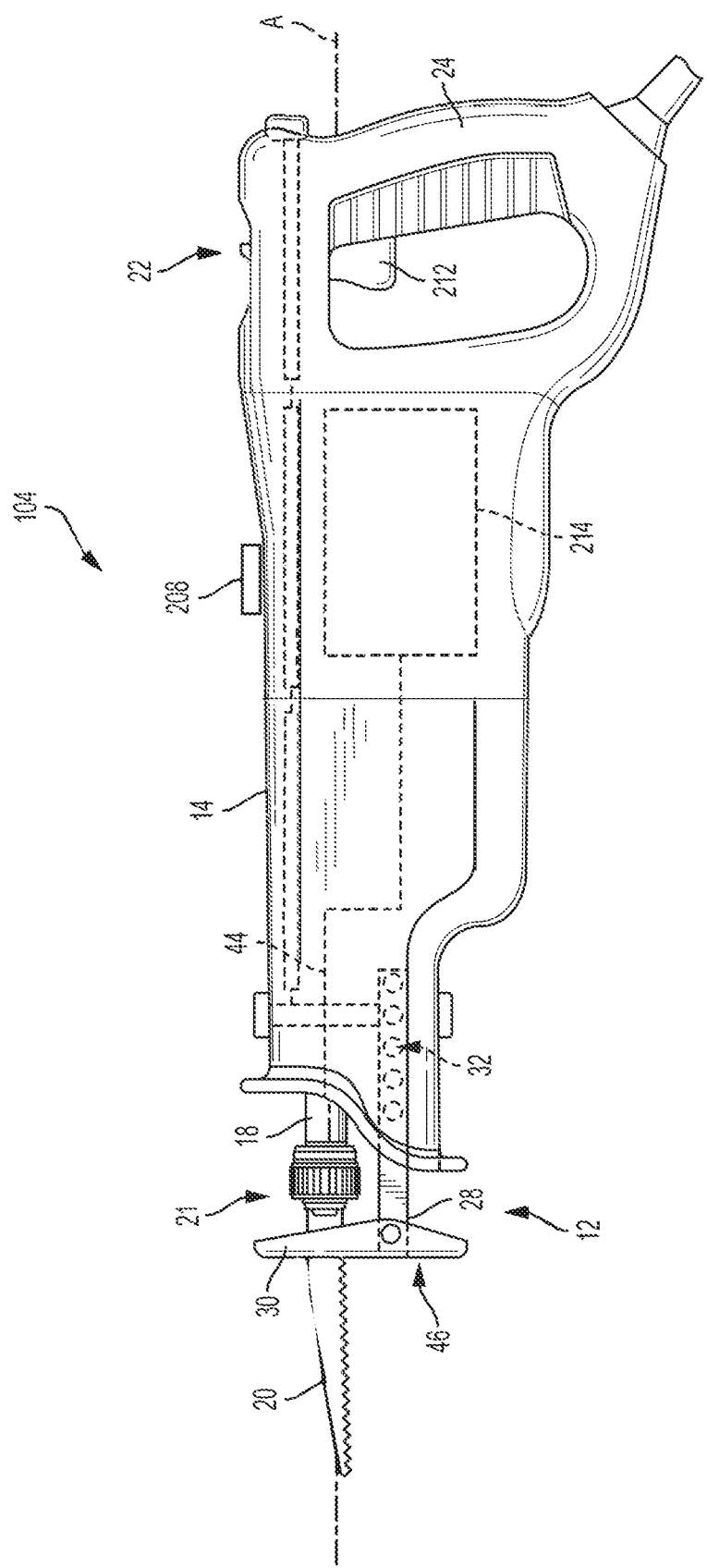
FIG. 2 illustrates a power tool of the communication system.

FIG. 2 illustrates an example of the power tool device 102, a reciprocating saw 104 (herein power tool 104). Although FIG. 2 illustrates the power tool 104 as a sabre saw, it is to be understood that the invention may be implemented on other types of reciprocating saws including, but not limited to, jigsaws, scroll saws, and rotary reciprocating saws. The power tool 104 defines a longitudinal axis A. The power tool 104 generally includes a shoe assembly 12, a main body 14 having a motor 214 provided with power via an electric cord (an AC version), a battery pack (a DC version) or a source of compressed air (a pneumatic version). A drive mechanism 44 (i.e., a transmission) converts rotational motion of the motor 214 to reciprocating motion of a reciprocating spindle 18 to reciprocate a saw blade 20 in a direction substantially parallel to the longitudinal axis A of the power tool 104. The saw blade 20 is held in place by a blade holder (e.g., a blade clamp 21) that is coupled to the reciprocating spindle 18. The power tool 104 also includes a handle assembly 22 positioned at a distal end of the main body 14 opposite the shoe assembly 12. The handle assembly 22 includes a grip portion 24 and a trigger 212 adjacent the grip portion 24 for actuating the motor 214. The trigger 212 is positioned such that a user can actuate the trigger 212 using the same hand that is holding the grip portion 24, for example, with an index finger. The power tool 104 further includes a mode pad 208. The mode pad 208 allows a user to select a mode of the power tool 104 and indicates to the user the currently selected mode of the power tool 104, which are described in greater detail below.

The shoe assembly 12 includes a shoe post 28 and a shoe 30. The shoe 30 is pivotally mounted on a distal end of the shoe post 28 away from the main body 14. In other constructions, the shoe 30 may be fixedly mounted to the shoe post 28, or mounted in other suitable ways. In other constructions, other types of shoe assemblies may be employed. The shoe assembly 12 is secured relative to the main body 14 of the power tool 104 and provides a guiding surface 46 for resting the power tool 104 against a workpiece (not shown) during cutting operations. The shoe assembly 12 includes the longitudinally-extending shoe post 28, extending substantially parallel to the longitudinal axis A of the power tool 104, which is at least partially disposed within an orifice of the main body 14 of the power tool 104. The shoe post 28 is axially movable relative to the main body 14 of the power tool 104 in a direction substantially parallel to the axis A and includes a locking mechanism 32 for stabilizing the shoe assembly 12 in one of a plurality of axial positions relative to the main body 14. For example, the locking mechanism 32 may include a ball detent system. In other constructions, other suitable types of locking mechanisms may be employed, such as magnets, cams, other types of detent mechanisms, etc.

Figure 3A:
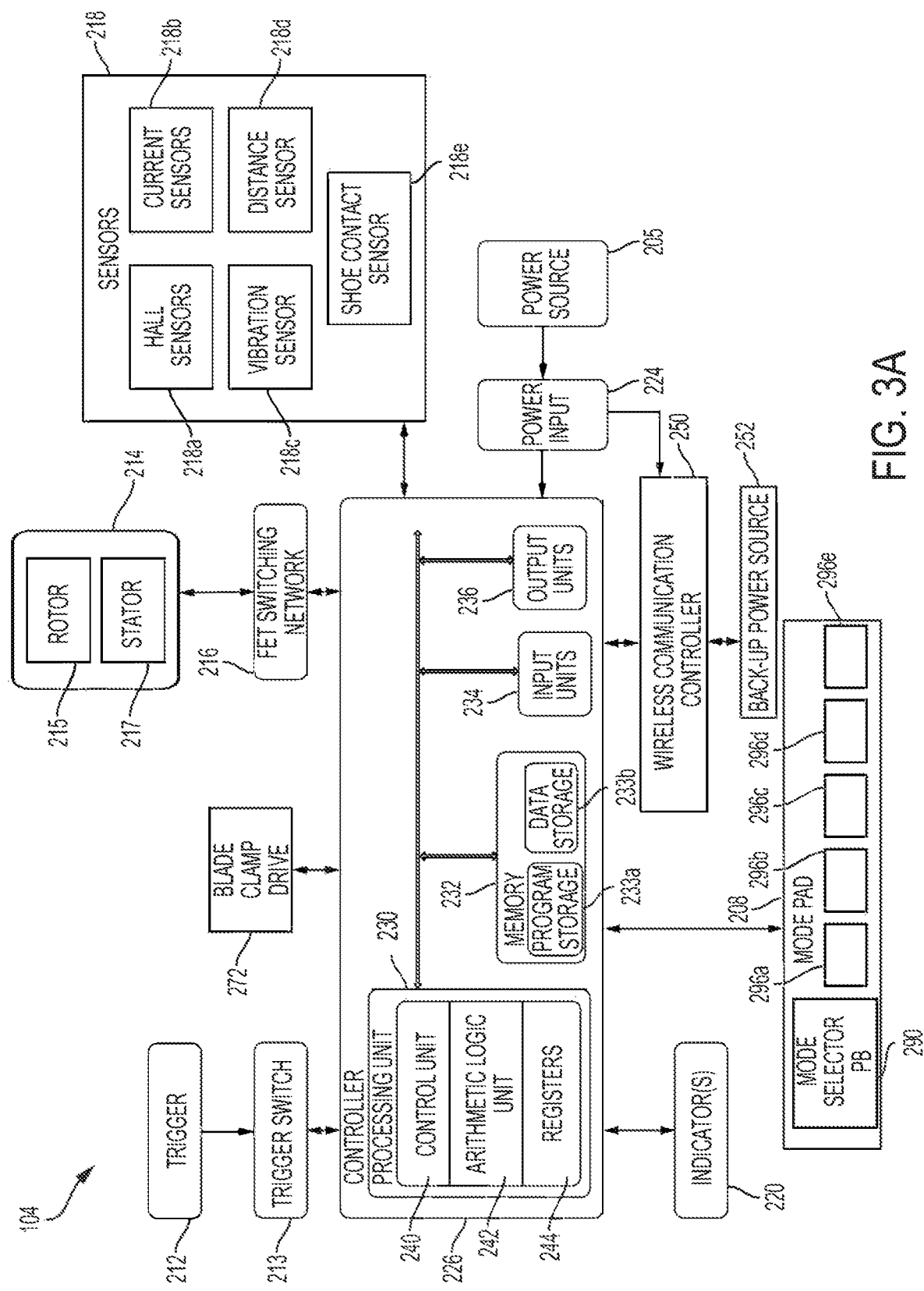
FIGS. 3A-B illustrate a schematic diagram of the power tool.

FIG. 3A illustrates a schematic diagram of the power tool 104 including the motor 214. The motor 214 actuates the drive device 210 and allows the drive device 210 to perform the particular task. A primary power source (e.g., a battery pack) 205 couples to the power tool 104 and provides electrical power to energize the motor 214. The motor 214 is energized based on the position of the trigger 212. When the trigger 212 is depressed the motor 214 is energized, and when the trigger 212 is released, the motor 214 is de-energized. In the illustrated embodiment, the trigger 212 extends partially down a length of the grip portion 24; however, in other embodiments the trigger 212 extends down the entire length of the grip portion 24 or may be positioned elsewhere on the power tool 104. The trigger 212 is moveably coupled to the grip portion 24 such that the trigger 212 moves with respect to the tool housing. The trigger 212 is coupled to a push rod, which is engageable with a trigger switch 213 (see FIG. 3A). The trigger 212 moves in a first direction towards the grip portion 24 when the trigger 212 is depressed by the user. The trigger 212 is biased (e.g., with a spring) such that it moves in a second direction away from the grip portion 24, when the trigger 212 is released by the user. When the trigger 212 is depressed by the user, the push rod activates the trigger switch 213, and when the trigger 212 is released by the user, the trigger switch 213 is deactivated. In other embodiments, the trigger 212 is coupled to an electrical trigger switch 213. In such embodiments, the trigger switch 213 may include, for example, a transistor. Additionally, for such electronic embodiments, the trigger 212 may not include a push rod to activate the mechanical switch. Rather, the electrical trigger switch 213 may be activated by, for example, a position sensor (e.g., a Hall-Effect sensor) that relays information about the relative position of the trigger 212 to the tool housing or electrical trigger switch 213. The trigger switch 213 outputs a signal indicative of the position of the trigger 212. In some instances, the signal is binary and indicates either that the trigger 212 is depressed or released. In other instances, the signal indicates the position of the trigger 212 with more precision. For example, the trigger switch 213 may output an analog signal that various from 0 to 5 volts depending on the extent that the trigger 212 is depressed. For example, 0 V output indicates that the trigger 212 is released, 1 V output indicates that the trigger 212 is 20% depressed, 2 V output indicates that the trigger 212 is 40% depressed, 3 V output indicates that the trigger 212 is 60% depressed 4 V output indicates that the trigger 212 is 80% depressed, and 5 V indicates that the trigger 212 is 100% depressed. The signal output by the trigger switch 213 may be analog or digital.

As also shown in FIG. 3A, the power tool 104 also includes the power source 205, a switching network 216, sensors 218, indicators 220, a power input unit 224, a controller 226, a wireless communication controller 250, and a back-up power source 252. The power source 205 provides power to the power input unit 224. The power input unit 224 includes active and/or passive components (e.g., voltage step-down controllers, voltage converters, rectifiers, filters, etc.) to regulate or control the power received from the power source 205 and by the wireless communication controller 250 and controller 226.

In some embodiments, the power tool 104 includes a battery pack interface (not shown). In such embodiments, the battery pack interface is coupled to the controller 226 and couples to a battery pack. The battery pack interface includes a combination of mechanical (e.g., the battery pack receiving portion 206) and electrical components configured to and operable for interfacing (e.g., mechanically, electrically, and communicatively connecting) the power tool 104 with the battery pack. The battery pack interface is coupled to the power input unit 224. The battery pack interface transmits the power received from the battery pack to the power input unit 224.

The switching network 216 enables the controller 226 to control the operation of the motor 214. Generally, when the trigger 212 is depressed as indicated by an output of the trigger switch 213, electrical current is supplied from the battery pack interface to the motor 214, via the switching network 216. When the trigger 212 is not depressed, electrical current is not supplied from the battery pack interface to the motor 214.

In response to the controller 226 receiving the activation signal from the trigger switch 213, the controller 226 activates the switching network 216 to provide power to the motor 214. The switching network 216 controls the amount of current available to the motor 214 and thereby controls the speed and torque output of the motor 214. The switching network 216 may include numerous FETs, bipolar transistors, or other types of electrical switches. For instance, the switching network 216 may include a six-FET bridge that receives pulse-width modulated (PWM) signals from the controller 226 to drive the motor 214.

The sensors 218 are coupled to the controller 226 and communicate to the controller 226 various signals indicative of different parameters of the power tool 104 or the motor 214. The sensors 218 include Hall sensors 218a, current sensors 218b, vibration sensors 218c, distance sensors 218d, shoe contact sensors 218e, among other sensors, such as, for example, one or more voltage sensors, one or more temperature sensors, and one or more torque sensors. The specific function of the sensors 218 will be explained in greater detail below.

Each Hall sensor 218a outputs motor feedback information to the controller 226, such as an indication (e.g., a pulse) when a magnet of the motor's rotor rotates across the face of that Hall sensor 218a. Based on the motor feedback information from the Hall sensors 218a, the controller 226 can determine the position, velocity, and acceleration of the rotor. In response to the motor feedback information and the signals from the trigger switch 213, the controller 226 transmits control signals to control the switching network 216 to drive the motor 214. For instance, by selectively enabling and disabling the FETs of the switching network 216, power received via the power source 205 is selectively applied to stator coils of the motor 214 to cause rotation of its rotor. The motor feedback information is used by the controller 226 to ensure proper timing of control signals to the switching network 216 and, in some instances, to provide closed-loop feedback to control the speed of the motor 214 to be at a desired level.

The indicators 220 are also coupled to the controller 226 and receive control signals from the controller 226 to turn on and off or otherwise convey information based on different states of the power tool 104. The indicators 220 include, for example, one or more light-emitting diodes ("LED"), or a display screen. The indicators 220 can be configured to display conditions of, or information associated with, the power tool 104. For example, the indicators 220 are configured to indicate measured electrical characteristics of the power tool 104, the status of the power tool 104, the mode of the power tool (discussed below), etc. The indicators 220 may also include elements to convey information to a user through audible or tactile outputs.

As described above, the controller 226 is electrically and/or communicatively connected to a variety of modules or components of the power tool 104. In some embodiments, the controller 226 includes a plurality of electrical and electronic components that provide power, operational control, and protection to the components and modules within the controller 226 and/or power tool 104. For example, the controller 226 includes, among other things, a processing unit 230 (e.g., a microprocessor, a microcontroller, or another suitable programmable device), a memory 232, input units 234, and output units 236. The processing unit 230 (herein, electronic processor 230) includes, among other things, a control unit 240, an arithmetic logic unit ("ALU") 242, and a plurality of registers 244 (shown as a group of registers in FIG. 3A). In some embodiments, the controller 226 is implemented partially or entirely on a semiconductor (e.g., a field-programmable gate array ["FPGA"] semiconductor) chip, such as a chip developed through a register transfer level ("RTL") design process.

The memory 232 includes, for example, a program storage area 233a and a data storage area 233b. The program storage area 233a and the data storage area 233b can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 230 is connected to the memory 232 and executes software instructions that are capable of being stored in a RAM of the memory 232 (e.g., during execution), a ROM of the memory 232 (e.g., on a generally permanent basis), or another non-transitory computer readable medium such as another memory or a disc. Software included in the implementation of the power tool 104 can be stored in the memory 232 of the controller 226. The software includes, for example, firmware, one or more applications, program data, filters, rules, one or more program modules, and other executable instructions. The controller 226 is configured to retrieve from memory and execute, among other things, instructions related to the control processes and methods described herein. The controller 226 is also configured to store power tool information on the memory 232 including operational data, information identifying the type of tool, a unique identifier for the particular tool, and other information relevant to operating or maintaining the power tool 104. The tool usage information, such as current levels, motor speed, motor acceleration, motor direction, may be captured or inferred from data output by the sensors 218. Such power tool information may then be accessed by a user with the external device 108. In other constructions, the controller 226 includes additional, fewer, or different components.

The wireless communication controller 250 is coupled to the controller 226. In the illustrated embodiment, the wireless communication controller 250 is located near the handle of the power tool 104 (see FIG. 2) to save space and ensure that the magnetic activity of the motor 214 does not affect the wireless communication between the power tool 104 and the external device 108.

Figure 3B:
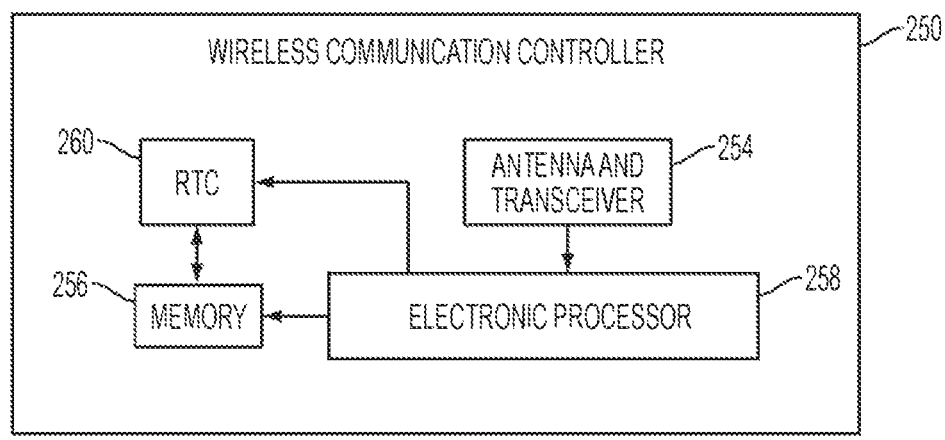

As shown in FIG. 3B, the wireless communication controller 250 includes a radio transceiver and antenna 254, a memory 256, an electronic processor 258, and a real-time clock (RTC) 260. The radio transceiver and antenna 254 operate together to send and receive wireless messages to and from the external device 108 and the electronic processor 258. The memory 256 can store instructions to be implemented by the electronic processor 258 and/or may store data related to communications between the power tool 104 and the external communication device 108 or the like. The electronic processor 258 for the wireless communication controller 250 controls wireless communications between the power tool 104 and the external device 108. For example, the electronic processor 258 associated with the wireless communication controller 250 buffers incoming and/or outgoing data, communicates with the controller 226, and determines the communication protocol and /or settings to use in wireless communications.

In the illustrated embodiment, the wireless communication controller 250 is a Bluetooth® controller. The Bluetooth® controller communicates with the external device 108 employing the Bluetooth® protocol. Therefore, in the illustrated embodiment, the external device 108 and the power tool 104 are within a communication range (i.e., in proximity) of each other while they exchange data. In other embodiments, the wireless communication controller 250 communicates using other protocols (e.g., Wi-Fi, cellular protocols, a proprietary protocol, etc.) over different type of wireless networks. For example, the wireless communication controller 250 may be configured to communicate via Wi-Fi through a wide area network such as the Internet or a local area network, or to communicate through a piconet (e.g., using infrared or NFC communications). The communication via the wireless communication controller 250 may be encrypted to protect the data exchanged between the power tool 104 and the external device/network 108 from third parties.

The wireless communication controller 250 is configured to receive data from the power tool controller 226 and relay the information to the external device 108 via the transceiver and antenna 254. In a similar manner, the wireless communication controller 250 is configured to receive information (e.g., configuration and programming information) from the external device 108 via the transceiver and antenna 254 and relay the information to the power tool controller 226.

The RTC 260 increments and keeps time independently of the other power tool components. The RTC 260 receives power from the power source 205 when the power source 205 is connected to the power tool 104 and receives power from the back-up power source 252 when the power source 205 is not connected to the power tool 104. Having the RTC 260 as an independently powered clock enables time stamping of operational data (stored in memory 232 for later export) and a security feature whereby a lockout time is set by a user and the tool is locked-out when the time of the RTC 260 exceeds the set lockout time.

The memory 232 stores various identifying information of the power tool 104 including a unique binary identifier (UBID), an ASCII serial number, an ASCII nickname, and a decimal catalog number. The UBID both uniquely identifies the type of tool and provides a unique serial number for each power tool 104. Additional or alternative techniques for uniquely identifying the power tool 104 are used in some embodiments.

Figure 4:
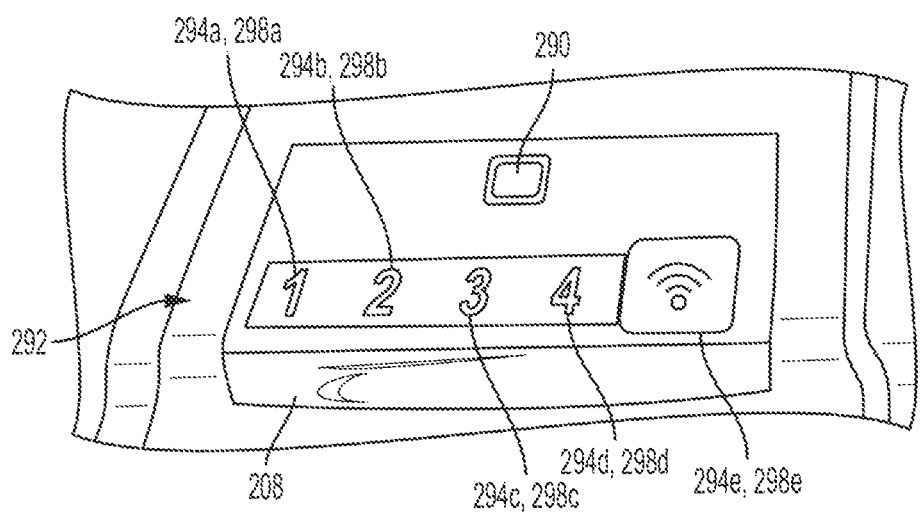
FIG. 4 illustrates a mode pad of the power tool.

FIG. 4 illustrates a more detailed view of the mode pad 208. The mode pad 208 is a user interface on the foot of the tool 104. The mode pad 208 includes the mode selection switch 290 and mode indicator LEDs block 292 having mode indicators 294a-e, each mode indicator 294a-e including one of LEDs 296a-e (see FIG. 3A) and an associated one of indicating symbols 298a-e (e.g., "1", "2", "3", "4", and a radio wave symbol). When an LED 296 is enabled, the associated indicating symbol 298 is illuminated. For instance, when LED 296a is enabled, the "1" (indicating symbol 298a) is illuminated.

The power tool 104 has five selectable modes (one, two, three, four, and adaptive), each associated with a different one of the mode indicators 294a-e. The mode selection switch 290 is a pushbutton that cycles through the five selectable modes upon each press (e.g., mode 1, 2, 3, 4, 5, 1, 2, and so on). The adaptive mode is represented by the indicating symbol 298e (the radio wave symbol). In the adaptive mode, the user is able to configure the power tool 104 via the external device 108, as is described in further detail below. For example, the external device 108 can send new profiles to the power tool 104 that can be stored in the profile bank 302. In other embodiments, the power tool 104 has more or fewer modes, and the mode selection switch 290 maybe a different type of switch such as, for example, a slide switch, a rotary switch, or the like.

Figure 5:
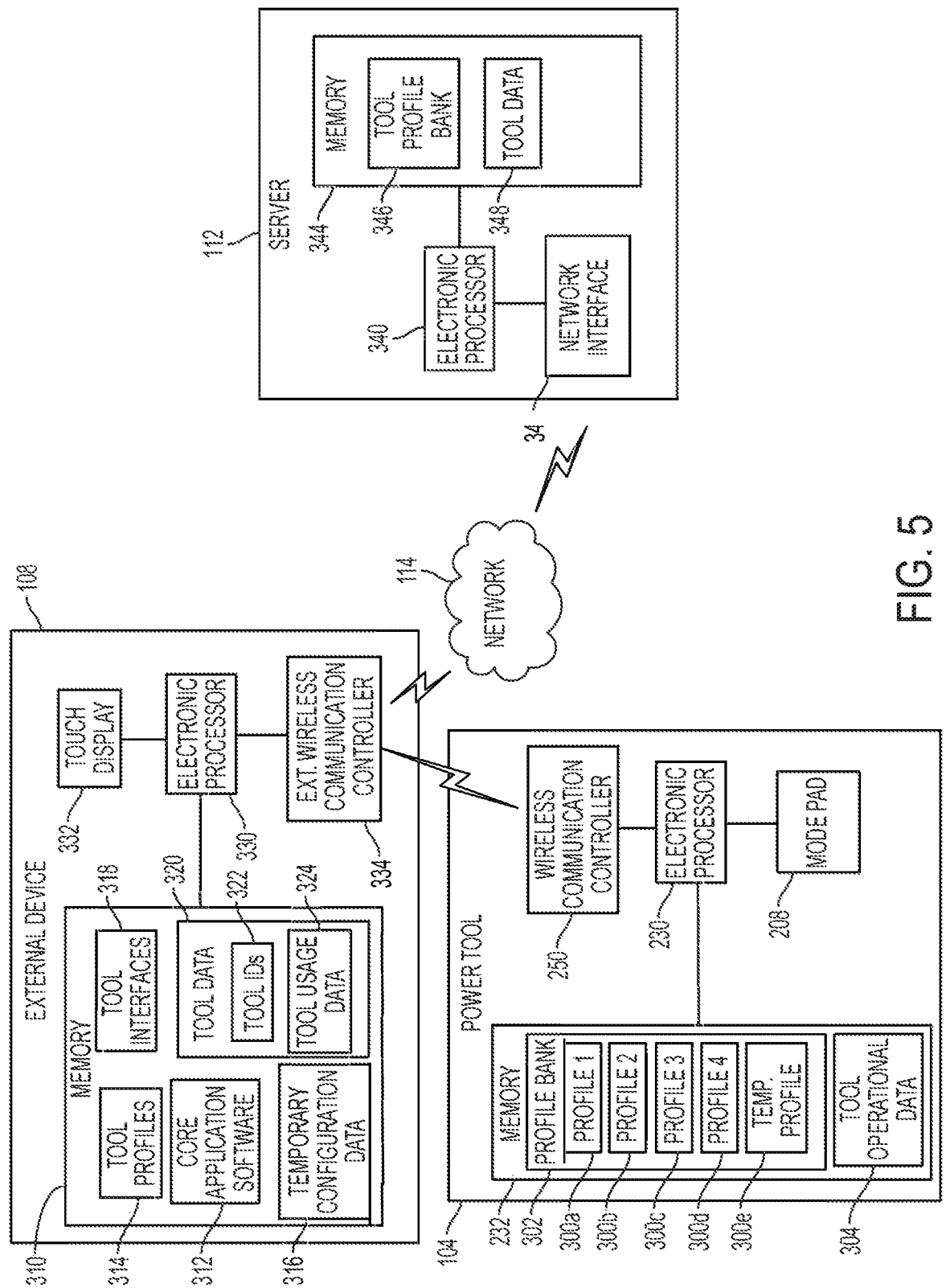
FIG. 5 illustrates a schematic diagram of the communication system including the power tool.

With reference to FIG. 5, modes one, two, three, and four are each associated with a mode profile configuration data block (a "mode profile") 300a-d, respectively, saved in the memory 232 in a (mode) profile bank 302. Each mode profile 300 includes configuration data that defines the operation of the tool 104 when activated by the user (e.g., upon depressing the trigger 212). For example, each profile may enable different features to be executed by the power tool 104. The features of each profile can be enabled and disabled, and parameters related to the features can be adjusted by the user as explained in greater detail below. For instance, a particular mode profile 300 may specify the motor speed, when to stop the motor, the duration and intensity of a work light (not shown), among other operational characteristics. The adaptive mode is associated with a temporary mode profile 300e saved in the memory 232. Also stored in the memory 232 is tool operational data 304, which includes, for example, information regarding the usage of the power tool 104 (e.g., obtained via the sensors 218), information regarding the maintenance of the power tool 104, power tool trigger event information (e.g., whether and when the trigger is depressed and the amount of depression). Additionally, the memory 232 may store user adjustable features that can be implemented across multiple modes on the power tool 104. The user can adjust the parameters of these features similarly to how the user can adjust the parameters of a profile as explained in greater detail below.

The external device 108 includes a memory 310 storing core application software 312, tool mode profiles 314, temporary configuration data 316, tool interfaces 318, tool data 320 including received tool identifiers 322 and received tool usage data 324 (e.g., tool operational data). The external device 108 further includes an electronic processor 330, a touch screen display 332, and an external wireless communication controller 334. The electronic processor 330 and memory 310 may be part of a controller having similar components as controller 226 of the power tool 104. The touch screen display 332 allows the external device 108 to output visual data to a user and receive user inputs. Although not illustrated, the external device 108 may include further user input devices (e.g., buttons, dials, toggle switches, and a microphone for voice control) and further user outputs (e.g., speakers and tactile feedback elements). Additionally, in some instances, the external device 108 has a display without touch screen input capability and receives user input via other input devices, such as buttons, dials, and toggle switches. The external device 108 communicates wirelessly with the wireless communication controller 250 via the external wireless communication controller 334, e.g., using a Bluetooth® or Wi-Fi® protocol. The external wireless communication controller 334 further communicates with the server 112 over the network 114. The external wireless communication controller 334 includes at least one transceiver to enable wireless communications between the external device 108 and the wireless communication controller 250 of the power tool 104 or the server 112 through the network 114. In some instances, the external wireless communication controller 334 includes two separate wireless communication controllers, one for communicating with the wireless communication controller 250 (e.g., using Bluetooth® or Wi-Fi® communications) and one for communicating through the network 114 (e.g., using Wi-Fi or cellular communications).

The server 112 includes an electronic processor 340 that communicates with the external device 108 over the network 114 using a network interface 342. The communication link between the network interface 342, the network 114, and the external wireless communication controller 334 may include various wired and wireless communication pathways, various network components, and various communication protocols. The server 112 further includes a memory 344 including a tool profile bank 346 and tool data 348.

Returning to the external device 108, the core application software 312 is executed by the electronic processor 330 to generate a graphical user interface (GUI) on the touch screen display 332 enabling the user to interact with the power tool 104 and server 112. In some embodiments, a user may access a repository of software applications (e.g., an "app store" or "app marketplace") using the external device 108 to locate and download the core application software 312, which may be referred to as an "app." In some embodiments, the tool mode profiles 314, tool interfaces 318, or both may be bundled with the core application software 312 such that, for instance, downloading the "app" includes downloading the core application software 312, tool mode profiles 314, and tool interfaces 318. In some embodiments, the app is obtained using other techniques, such as downloading from a website using a web browser on the external device 108. As will become apparent from the description below, at least in some embodiments, the app on the external device 108 provides a user with a single entry point for controlling, accessing, and/or interacting with a multitude of different types of tools. This approach contrasts with, for instance, having a unique app for each type of tool or for small groupings of related types of tools.

Figure 6:
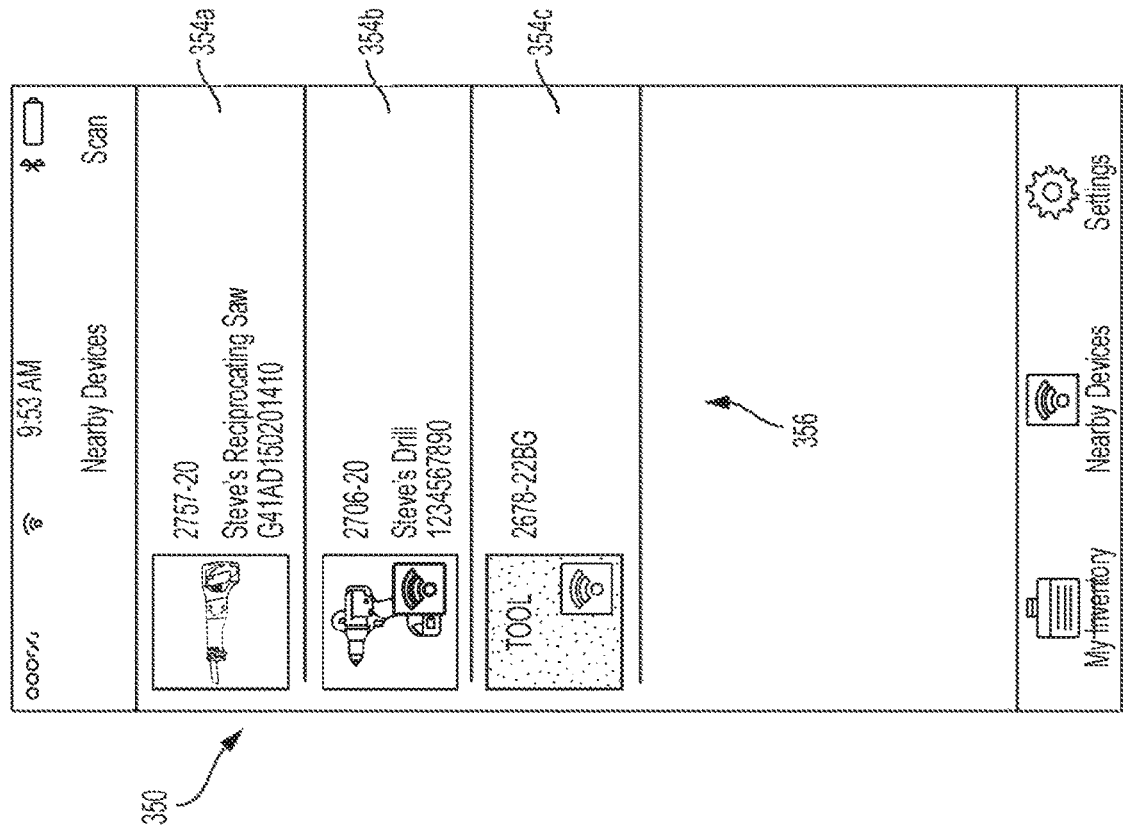

FIG. 6 illustrates a nearby devices screen 350 of the GUI on the touch screen display 332. The nearby devices screen 350 is used to identify and communicatively pair with power tools 104 within wireless communication range of the external device 108 (e.g., local power tools). For instance, in response to a user selecting the "scan" input 352, the external wireless communication controller 334 scans a radio wave communication spectrum used by the power tools 104 and identifies any power tools 104 within range that are advertising (e.g., broadcasting their UBID and other limited information). The identified power tools 104 that are advertising are then listed on the nearby devices screen 350. As shown in FIG. 6, in response to a scan, three power tools 104 that are advertising (advertising tools 354*a-c*) are listed in the identified tool list 356. In some embodiments, if a power tool 104 is already communicatively paired with a different external device, the power tool 104 is not advertising and, as such, is not listed in the identified tool list 356 even though the power tool 104 may be nearby (within wireless communication range of) the external device 108. The external device 108 is operable to pair with tools 354 that are in a connectable state. The external device 108 provides a visual state indication 358 in the identified tool list 356 of whether an advertising tool 354 is in the connectable state or the advertising state. For instance, the visual state indication 358 of a tool may be displayed in one color when the tool is in a connectable state and may be displayed in another color when the tool is not in the connectable state. The UBID received from the tools 354 is used by the external device 108 to identify the tool type of each tool 354.

From the nearby devices screen 350, a user can select one of the tools 354 from the identified tool list 356 to communicatively pair with the selected tool 354. Each type of power tool 104 with which the external device 108 can communicate includes an associated tool graphical user interface (tool interface) stored in the tool interfaces 318. Once a communicative pairing occurs, the core application software 312 accesses the tool interfaces 318 (e.g., using the UBID) to obtain the applicable tool interface for the type of tool that is paired. The touch screen 332 then shows the applicable tool interface. A tool interface includes a series of screens enabling a user to obtain tool operational data, configure the tool, or both. While some screens and options of a tool interface are common to multiple tool interfaces of different tool types, generally, each tool interface includes screens and options particular to the associated type of tool. The power tool 104 has limited space for user input buttons, triggers, switches, and dials. However, the external device 108 and touch screen 332 provide a user the ability to map additional functionality and configurations to the power tool 104 to change the operation of the tool 104. Thus, in effect, the external device 108 provides an extended user interface for the power tool 104, providing further customization and configuration of the power tool 104 than otherwise possible or desirable through physical user interface components on the tool. Examples further explaining aspects and benefits of the extended user interface are found below.

Figure 7:
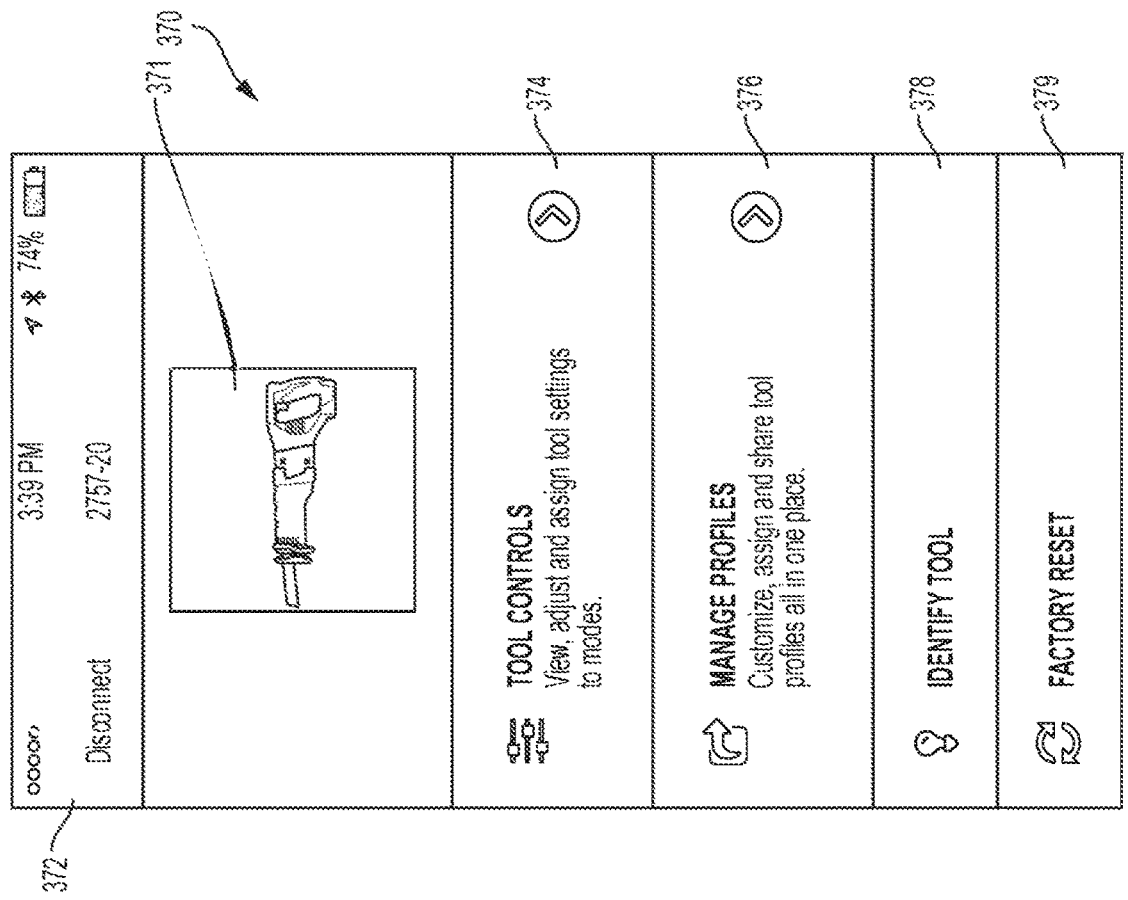
FIGS. 6, 7, 8A, 8B, 9, 10, 11, 12A, 12B, and 12C illustrate exemplary screenshots of a user interface of an external device of the communication system.

FIG. 7 illustrates a home screen 370 of the tool interface when the power tool 104 is a reciprocating saw. The home screen 370 includes an icon 371 for the particular paired powered tool 104, which may be the same as the icon shown in the list 356. The home screen 370 also includes a disconnect input 372 enabling the user to break the communicative pairing between the external device 108 and the paired power tool 104. The home screen 370 further includes four selectable options: tool controls 374, manage profiles 376, identify tool 378, and factory reset 379. Selecting identify tool 378 sends a command to the paired power tool 104 requesting that the paired power tool 104 provide a user-perceptible indication, such as flashing a work light, a light of the indicator 220, flashing LEDs 296, making an audible beep using a speaker of the indicators 220, and/or using the motor 214 to vibrate the tool. The user can then identify the particular tool communicating with the external device 108.

Figures 8A, 8B:
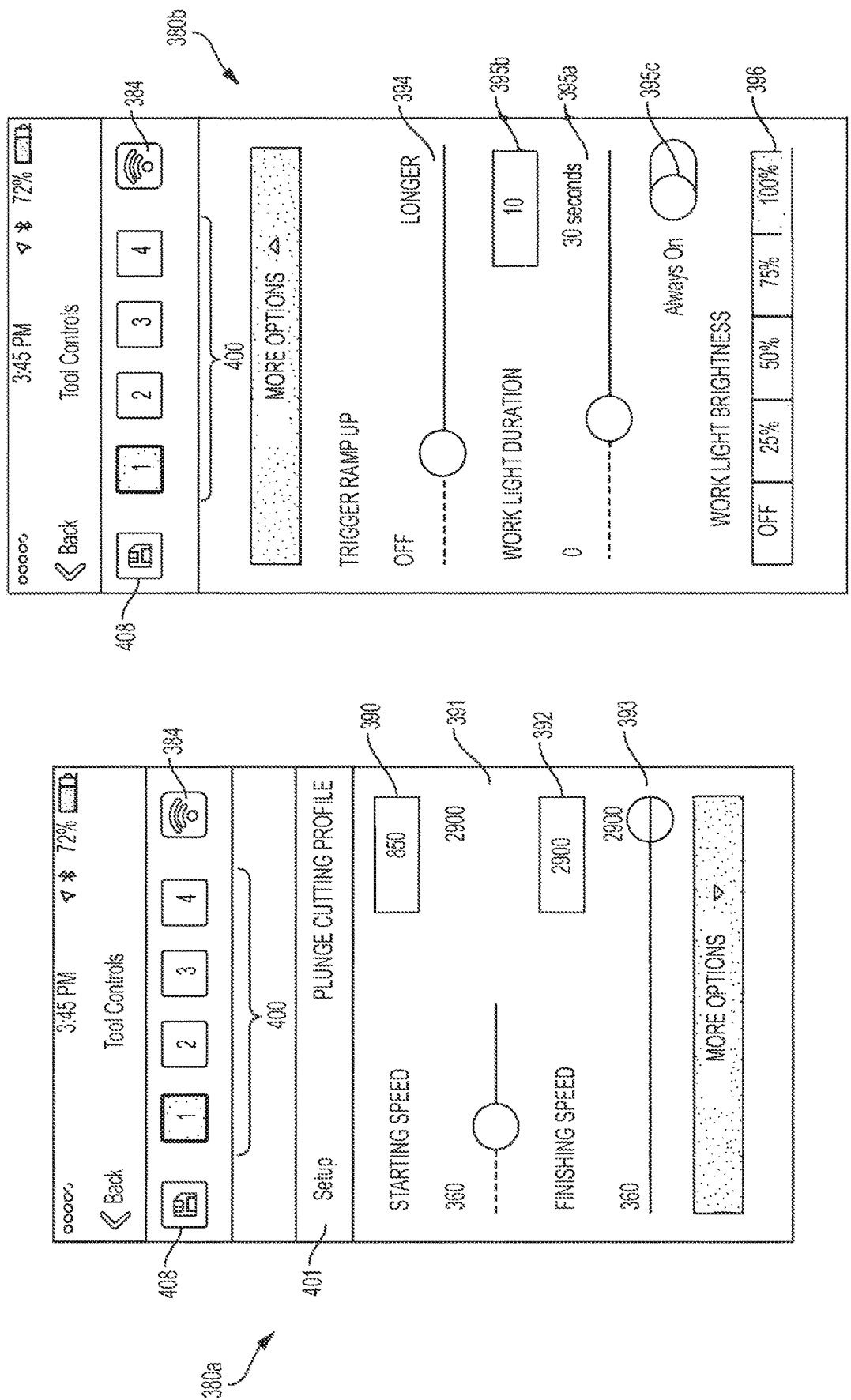

Selecting tool controls 374 causes a control screen of the tool interface to be shown, such as the control screen 380 of FIGS. 8A-B, which includes a top portion 380*a* and a bottom portion 380*b*. Generally, the control screen shown depends on the particular type of profile. In other words, generally, each type of mode profile has a specific control screen. Each control screen has certain customizable parameters that, taken together, form a mode profile. The particular control screen shown on the external device 108 upon selecting the tool controls 374 is the currently selected mode profile of the power tool 104 (e.g., one of the mode profiles 300*a-e*). To this end, upon selection of the tool controls 374, the external device 108 requests and receives the currently selected one of the mode profiles 300*a-e* from the power tool 104. The external device 108 recognizes the mode profile type of the selected one of the mode profiles 300*a-e*, generates the appropriate control screen for the mode profile type, and populates the various parameter settings according to settings from the received mode profile 300.

When in the adaptive mode, the currently selected mode profile that is shown on the control screen is the temporary mode profile 300e. Additionally, when the power tool 104 is in the adaptive mode, the power tool 104 is operated according to the temporary mode profile 300e. The source of profile data in the temporarily mode profile 300e (and what is being displayed on the control screen 380) varies. Initially, upon entering the adaptive mode via the mode selection switch 290, the mode profile 300a (associated with mode 1) is copied into the temporary mode profile 300e of the power tool 104. Thus, after a user causes the power tool 104 to enter the adaptive mode using the mode selection switch 290, the power tool 104 initially operates upon a trigger pull as if mode 1 (mode profile 300a) was currently selected. Additionally, as the control screen displays the mode profile saved as the temporarily mode profile 300e, the mode profile 300a that was just copied to the temporary mode profile 300e is shown on the control screen.

In some embodiments, another mode profile 300 (e.g., 300b-d) is copied into the temporary mode profile 300e upon first entering the adaptive mode and is provided (as the temporary mode profile 300e) to the external device 108 for populating the control screen 380. In still other embodiments, the control screen shown upon selecting the tool controls 374 is a default control screen with default profile data for the particular type of tool, and the external device 108 does not first obtain profile data from the power tool 104. In these instances, the default mode profile is sent to the power tool 104 and saved as the temporary mode profile 300e.

Figure 9:
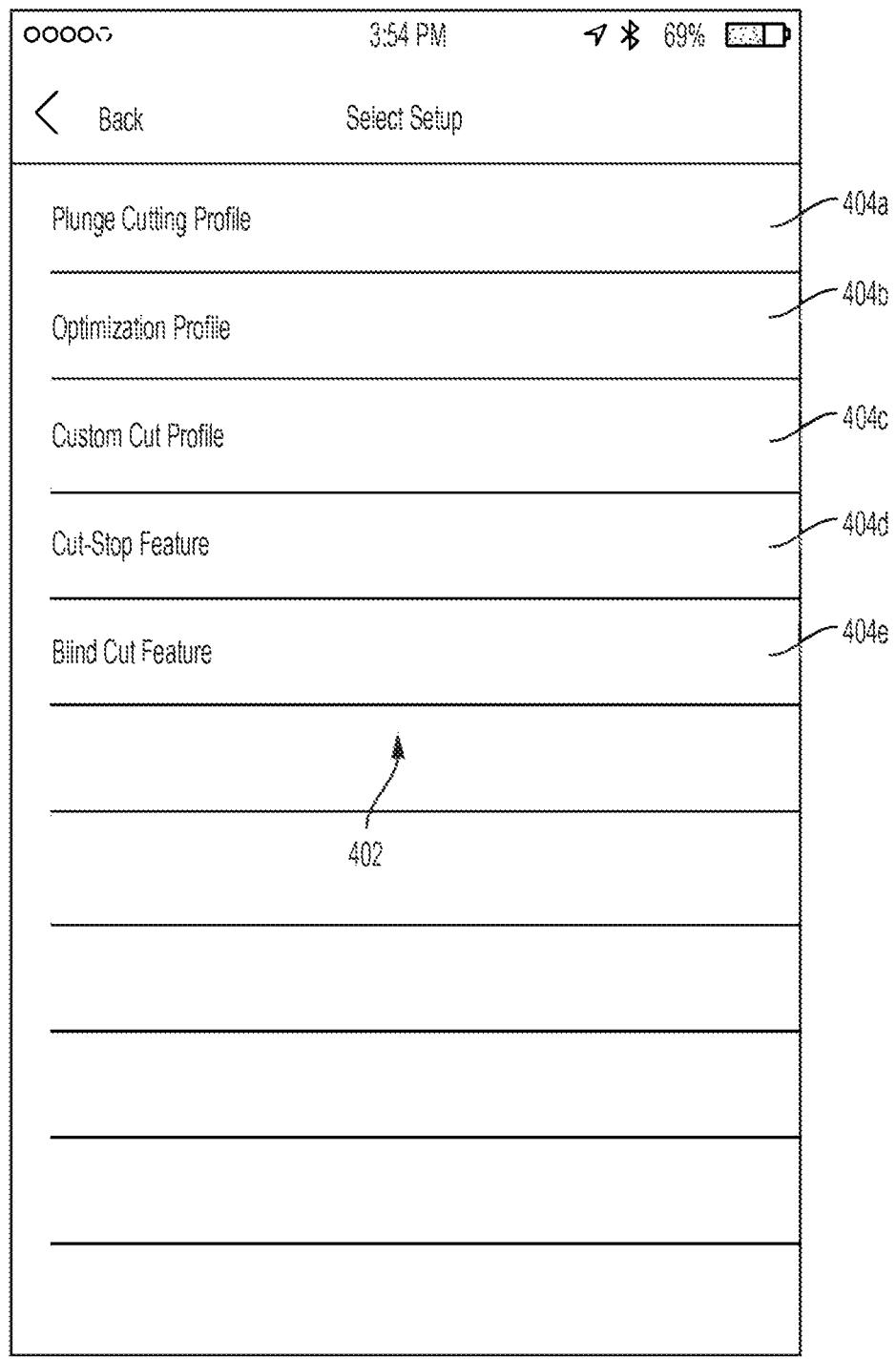

Further, assuming that the power tool 104 is in the adaptive mode, after the external device 108 initially loads the control screen (e.g., control screen 380) upon selecting the tool controls 374, the user may select a new source of profile data for the temporary file. For instance, upon selecting one of the mode profile buttons 400 (e.g., mode 1, mode 2, mode 3, or mode 4) the associated mode profile 300a-d is saved as the temporary mode profile 300e and sent to the external device 108 and populates the control screen (according to the mode profile type and mode profile parameters). Additionally, assuming the power tool 104 is in the adaptive mode, a user may select a mode profile type using the setup selector 401. Upon selecting the setup selector 401, a list of available profiles (profile list) 402 for the particular type of paired power tool 104 is shown (see, e.g., FIG. 9). The profile list 402 includes profiles 404 obtained from tool profiles 314 and/or from the tool profile bank 346 over the network 114. These listed profiles 404 can include default profiles and custom profiles previously generated and saved by a user, as is described in more detail below. Upon selecting one of the tool profiles 404, the selected profile 404 and its default parameters are illustrated on the control screen 380 of the external device 108 and the profile 404 as currently configured is sent to the power tool 104 and saved as the temporary mode profile 300e. Accordingly, upon a further trigger pull, the power tool 104 will operate according to the selected one of the tool profiles 404.

When the adaptive mode is currently selected on the power tool 104, as indicated by the indicating symbol 298e (FIG. 4), the user is able to configure (e.g., change some of the parameters of the temporary mode profile 300e) the power tool 104 using the control screen 380. When the power tool 104 is in one of the other four tool modes, as indicated by one of the indicating symbols 298a-d, the power tool 104 is not currently configurable via the control screen 380. For instance, in FIG. 10, a control screen 381 is illustrated when the power tool is not currently in the adaptive mode. Here, the control screen 381 is similar to the control screen 380, but includes a message 382 indicating that the tool is not in the adaptive mode and a wireless symbol 384 is shown greyed-out as a further indication that the power tool is not in the adaptive mode. Accordingly, when the power tool 104 is not in the adaptive mode and a user selects one of the mode profile buttons 400, the power tool 104 provides the mode profile 300 of the associated mode selected by the user, but does not overwrite the temporary mode profile 300e with the mode profile. Thus, the mode profiles 300 of the power tool 104 are not updated when the power tool 104 is not in the adaptive mode.

Referring back to FIGS. 8A-B, when the power tool 104 is in the adaptive mode and the user selects the tool controls 374 on the home screen, the user is able to configure profile data of the power tool 104 using a control screen of the tool interface. For instance, via the control screen 380, the user is able to configure the current profile data of the temporary mode profile 300e of the power tool 104. As illustrated, the user is able to adjust the starting speed via the speed text box 390 or the speed slider 391; adjust the finishing speed via the speed text box 392 or the speed slider 393; adjust the trigger ramp up period via slider 394; adjust the work light duration with slider 395a, work light text box 395b, and "always on" toggle 395c; and adjust the work light intensity via the work light brightness options 396.

In some embodiments, the external device 108 and power tool 104 enable live updating of the temporary mode profile 300e. When live updating, the temporary mode profile 300e of the power tool 104 is updated as changes to the parameters are made on the control screen 380 without requiring a subsequent saving step or actuation being taken by the user on the GUI of the external device 108 or on the power tool. In other words, when live updating, the external device 108 updates the temporary mode profile 300e on the power tool 104 in response to receiving a user input changing one of the parameters, rather than in response to a user input saving the temporary mode profile 300e. For instance, with respect to FIG. 8A, the starting speed of the power tool 104 is set to 2900 revolutions per minute (RPM). When live updating, if a user slides the speed slider 391 to the right by dragging his/her finger across the speed slider 391 and then removing his/her finger from the touch screen 332 of the external device 108 upon reaching a new speed, the external device 108 will send the newly selected starting speed to the power tool 104 to update the temporary mode profile 300e when the user's finger is removed from the screen, without requiring a further depression of a button or other actuation by the user. Live updating is applicable to the other parameters on the control screen 380 as well, such as the finishing speed, trigger ramp up period, and work light parameters. Live updating enables rapid customization of the power tool 104 so that a user may test and adjust various profile parameters quickly with fewer key presses. In contrast to live updating, in some embodiments, after sliding the speed slider 391 to the new speed, the user must press a save button (e.g., save button 408) to effect the update of the starting speed parameter on the temporary mode profile 300e.

Figure 11:
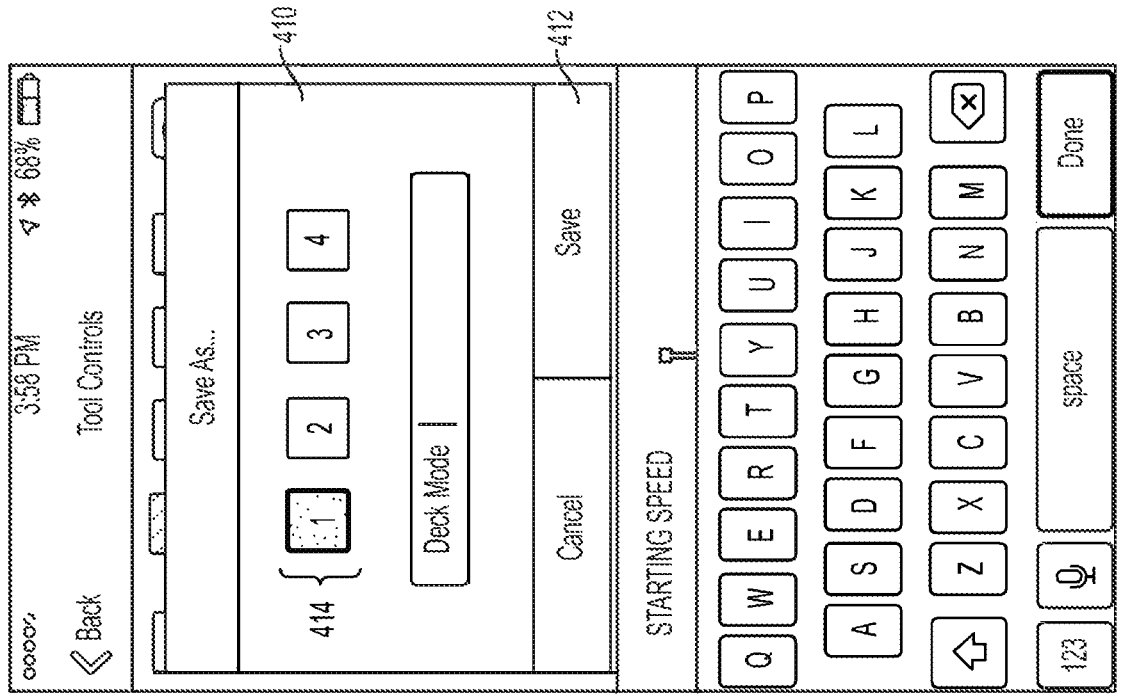

A user is also able to save a mode profile via a control screen (e.g., the control screen 380) to the power tool 104. More particularly, the user is able to overwrite one of the mode profiles 300a-d in the profile bank 302 with the mode profile as specified on a control screen. To save the mode profile generated by the user via the control screen 308, the user selects the save button 408. As shown in FIG. 11, pressing the save button causes the core application software to generate a save prompt 410 requesting the user to name the created mode profile and specify which of the mode profiles 300*a*-*d* to overwrite with the created mode profile. In response to the user input, the external device 108 sends the generated mode profile to the power tool 104. The processor 230 receives the generated mode profile and overwrites the mode profiles 300 in the profile bank 302 specified for overwriting by the user with the generated mode profile. For example, in FIG. 11, the user has named the generated mode profile "Deck Mode" and specified that the electronic processor 230 overwrite mode profile 300*a* (associated with mode "1") with the generated "Deck Mode" mode profile. In some embodiments, the user can elect to overwrite more than one mode profile 300*a*-*e* with the generated mode profile by selecting multiple of the mode labels 414 before selecting the save button 412. In some embodiments, the user can elect to not overwrite any of the mode profiles 300*a*-*e* with the generated mode profile by not selecting any of the mode labels 414 before selecting the save button 412. In such embodiments, the generated mode profile is saved in the profile bank 346 on the server 112, but not on the power tool 104. Overwriting a profile (old profile) with another profile (new profile) may include, for example, storing the new profile at the location in memory that was storing the old profile, thereby erasing the old profile and replacing it in memory with the new profile, or may include storing the new profile at another location in memory and updating a profile pointer to point to the address in memory having the new profile instead of the address in memory having the old profile.

Figure 10:
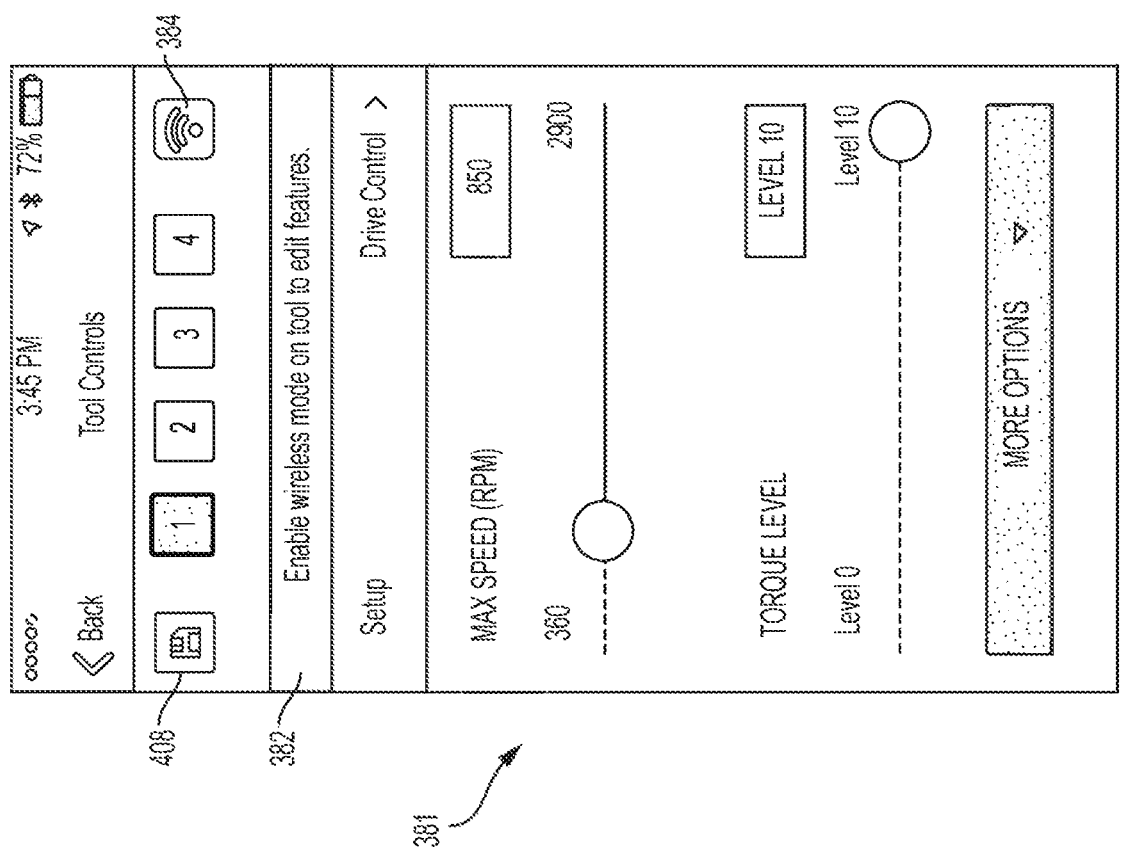

As noted above, in some embodiments, the external device 108 cannot overwrite data of the profiles 300 unless the power tool 104 is in the adaptive mode (see FIG. 10). This aspect prevents a potentially malicious individual, separate from the user currently operating the power tool 104, from adjusting tool parameters of the power tool 104 unless the user places the power tool 104 in the adaptive mode. Thus, a user of the power tool 104 can prevent others from adjusting parameters by operating the power tool 104 in one of the other four modes. In some embodiments, to implement this aspect, a hardware or firmware based interlock prevents the electronic processor 230 from writing to the profile bank 302 unless the power tool 104 is in the adaptive mode. Furthermore, when the power tool 104 is in operation, a hardware or firmware based interlock prevents the electronic processor 230 from writing to the profile bank 302. The electronic processor 230 may detect that the power tool 104 is in operation based on depression of the trigger 212 or outputs from Hall sensors 218*a* indicating motor spinning. Thus, even when the power tool 104 is in the adaptive mode, if the power tool 104 is currently operating, the electronic processor 230 will not update or write to the profile bank 302 even when the power tool 104 is in the adaptive mode and the external device 108 communicates to the power tool 104 a generated profile (e.g., in response to a user selecting the save button 408).

Furthermore, in some embodiments, the electronic processor 230 outputs to the external device 108, via the wireless communication controller 250, a signal indicative of whether the power tool 104 is currently operating. In turn, the external device 108 provides an indication to the user, such as through the wireless symbol 384 changing color (e.g., to red) or flashing and a message when the power tool 104 is currently operating. Moreover, the ability to update parameters via a control screen is prevented, similar to the control screen 381 of FIG. 10, when the external device 108 receives an indication that the power tool 104 is currently operating.

Returning to FIG. 7, selecting the factory reset 379 on the home screen 370 causes the external device 108 to obtain default mode profiles from the tool mode profiles 314 or from the tool profile bank 346 on the server 112, and provide the default profiles to the power tool 104, which then overwrites the profile bank 302 with the default mode profiles.

The home screen 370 may be similar in look and feel for all, many, or several of the tool interfaces 318, although the icon 371 may be customized for the specific tool interface based on the specific power tool with which the external device 108 is paired. Further, the options listed below the icon may add an "obtain data" option that enables the user to select and obtain operational data from the tool for display on the external device 108 and/or sending to the server 112 for storage as part of the tool data 348. Additionally, in instances where a particular tool is not intended to be configured by the external device 108, the tool controls 374 and manage profiles 376 options may be not included on the home screen 370.

In some embodiments, an adaptive mode switch separate from the mode selection switch 290 is provided on the power tool 104. For instance, LED 296*e* (FIG. 3A) may be a combined LED-pushbutton switch whereby, upon first pressing the combined LED-pushbutton switch, the power tool 104 enters the adaptive mode and, upon a second pressing of the switch, the power tool 104 returns to the mode that it was in before first pressing (e.g., mode 1). In this case, the mode selection switch 290 may cycle through modes 1-4, but not the adaptive mode. Furthermore, certain combinations of trigger pulls and/or placement of the forward/reverse selector 219 into a particular position (e.g., neutral) may cause the power tool 104 to enter and exit the adaptive mode.

Figure 22B:
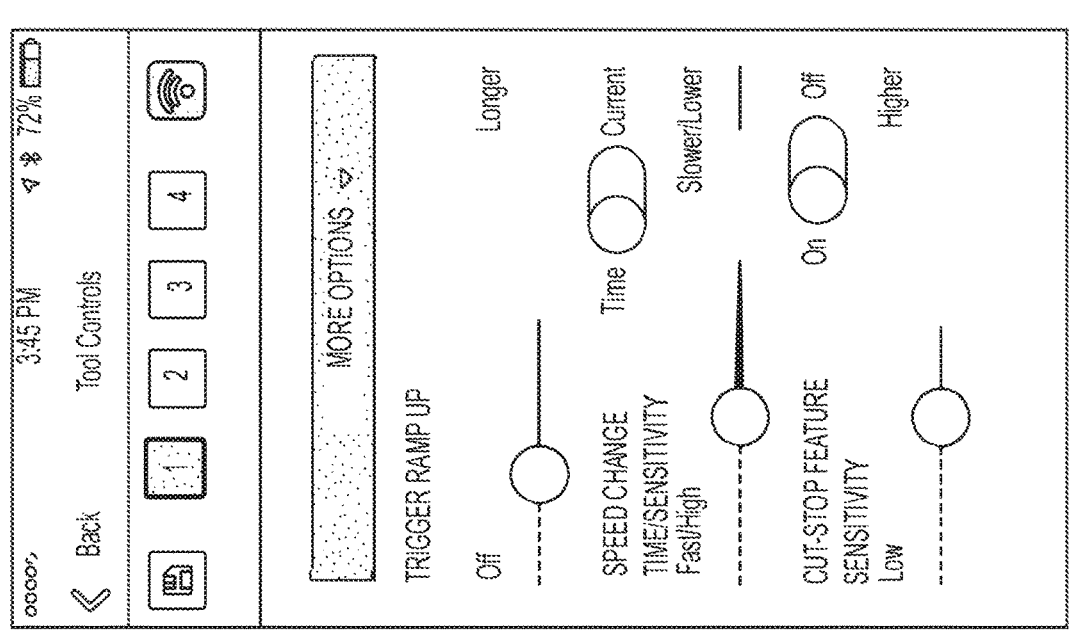
FIGS. 22A and 22B illustrate further exemplary screenshots of the user interface of the external device of the communication system.
Figure 22A:
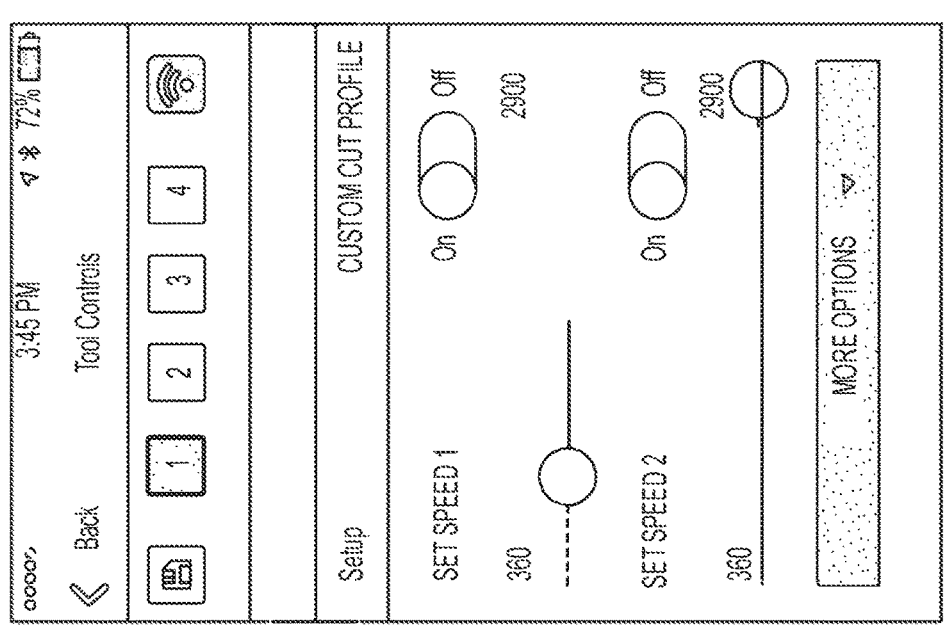

Returning to the concept of mode profiles (e.g., profiles 300), a mode profile includes one or more features, which may further include one or more parameters. For instance, returning to FIGS. 8A-B, the mode profile illustrated is the plunge cutting profile, which has a plunge cutting feature and a worklight control feature. The plunge cutting feature includes the following parameters: starting speed, finishing speed, and trigger ramp up period. The worklight control feature includes a worklight duration parameter and a worklight brightness parameter. Some profiles, such as a custom cut profile as shown in FIGS. 22A and 22B, include features (e.g., the plunge cutting feature and a cut-stop feature) that include parameters as well. The particular features and parameters available for customization on a control screen of the external device 108 vary based on mode profile type.

The control screens of the tool interfaces 318 place bounds on the values that a user can enter for a particular parameter. For instance, in FIG. 8A, the starting speed cannot be set above 2900 RPM or below 360 RPM. The power tool 104 further includes a boundary check module, e.g., in firmware stored on the memory 232 and executed by the electronic processor 230. At the time of receiving a new profile from the external device 108 for saving in the profile bank 302, the boundary check module confirms that each parameter is within maximum and minimum boundaries or is otherwise a valid value for the particular parameter. For instance, the boundary check module confirms that the starting speed set for the plunge cutting profile is within the range of 360 RPM to 2900 RPM. In some instances, the boundary check module confirms the parameter values of the power tool's current profile are within acceptable boundaries upon each trigger pull. To carry out the boundary check, the firmware may include a list of parameters and the applicable maximum and minimum boundaries stored in, for instance, a table, and the electronic processor 230 is operable to perform comparisons with the table data to determine whether the parameter values are within the acceptable boundaries. The boundary check module provides an additional layer of security to protect against maliciously generated or corrupted profiles, features, and parameter values.

Figure 12A:
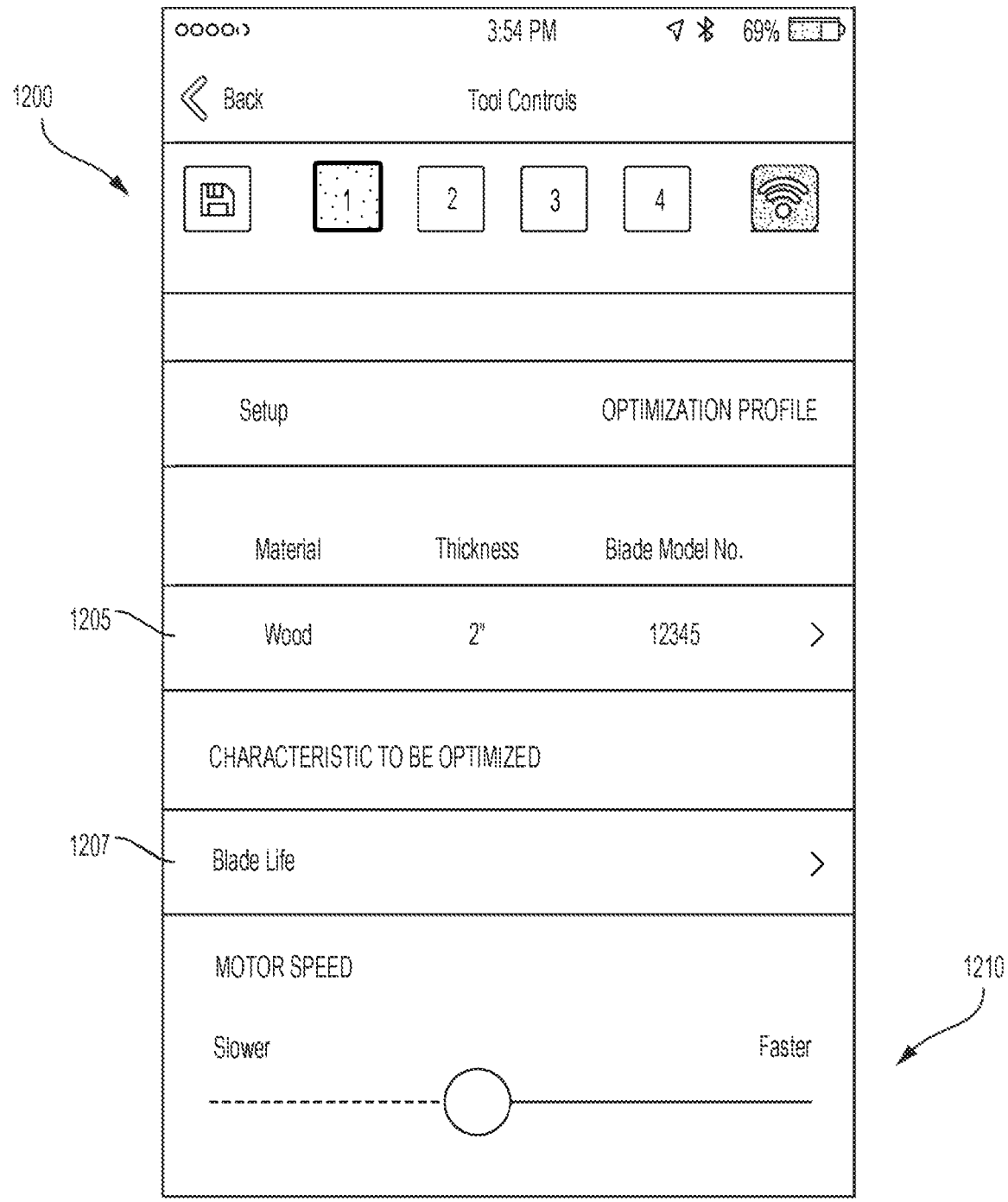

Upon the boundary check module determining that a parameter value is outside of an acceptable range, the controller 226 is operable to output an alert message to the external device 108 that indicates the error (which may be displayed in text on the touch screen 332), drive indicators 220, LEDs 296*a-e*, vibrate the motor, or a combination thereof On some control screens of tool interfaces 318, a parameter assist block is provided. The parameter assist block includes work factor inputs that allow a user to specify details of the workpiece on which the power tool will operate (e.g., material type, thickness, and/or hardness), details on fasteners to be driven by the power tool (e.g., material type, screw length, screw diameter, screw type, and/or head type), and/or details on an output unit of the power tool (e.g., saw blade type, number of saw blade teeth, drill bit type, and/or drill bit length). For instance, an optimization profile control screen 1200 includes a parameter assist block 1205, as shown in FIG. 12A. The parameter assist block 1205 includes work factor inputs that allow a user to specify a material being cut, a thickness of the material being cut, and a model number or type of the blade 20 (e.g., no. 12345, wood cutting blade, metal cutting blade, blade length, number of teeth, rough cut blade, etc.). In some embodiments, by selecting the parameter assist block 1205, a parameter assist screen is generated on which the user can specify each of the work factor inputs by cycling through values using the touch screen 332. Upon completing entry of the work factor inputs, the external device 108 adjusts parameters of the profile. For instance, in FIG. 12A, the value of the motor speed parameter 1210 is adjusted by the external device 108 based on the work factor inputs of the parameter assist block 1205. The external device 108 may adjust the motor speed parameter 1210 using a look-up table that includes parameter values corresponding to the user inputs in the parameter assist block 1205. If desired, the user may be able to further adjust some or all of the parameters (e.g., using a slider on the GUI as shown in FIG. 12A).

Different parameter assist blocks are provided for different profile and feature types, and each parameter assist block may include work factor inputs appropriate to the particular profile or feature type. Furthermore, one or more boundary values of the parameters on the control screen 1200 may be adjusted by the external device 108 based on the work factor inputs of the parameter assist block 1205. For example, the maximum speed selectable by the user for the motor speed parameter 1210 may be adjusted based on the inputs received by the parameter assist block 1205.

As shown in FIG. 8A, the parameters of the plunge cutting profile include two user adjustable parameters of the same parameter type (motor speed) that are applicable at different stages (or zones) of a single tool operation. More specifically, for the plunge cutting profile, a user is operable to specify on the control screen 380 a starting motor speed during the starting stage of a cutting operation and a finishing speed during a final/finishing stage of the cutting operation. The controller 226 determines when the different stages of the cutting operation occur and are transitioned between as will be explained in greater detail below. In some embodiments, in the various stages of the plunge cutting profile (and in other profiles and features), the user-selected speeds are treated as maximum speed values. Accordingly, in these embodiments, the speed of the motor 214 varies based on the amount of depression of the trigger 212, but the controller 226 ensures that the motor 214 does not exceed the user-selected speeds for the various stages.

Figure 14:
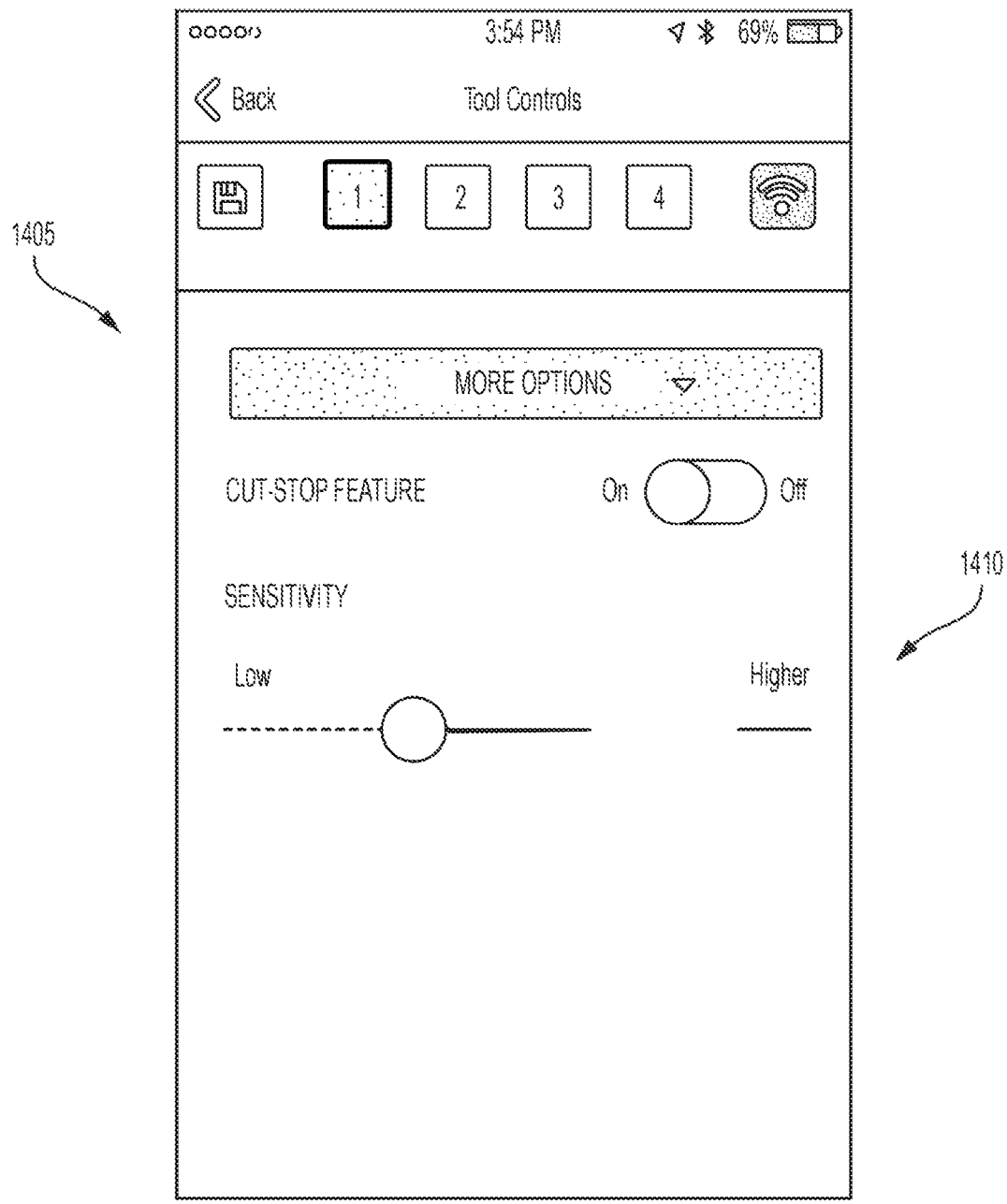
FIG. 14 illustrates a further exemplary screenshot of the user interface of the external device of the communication system.

Further profile types and features are available to the power tool 104. Further profile types include a custom cut profile as explained in greater detail below. Some features available to the power tool 104 that may be selectively enabled in some profiles include the cut-stop feature, a blind-cut feature, a wave cutting feature, and a vibration reduction feature. As noted above, for each profile, a unique control screen of the associated tool interface 318 may be provided on the GUI of the external device 108. Using the control screen, a user can selectively enable and disable features within a profile and can adjust parameters of the profile and features. Based on the parameters of the above-mentioned profiles and features, the controller 226 generates particular control signals to the FETs through the switching network 216 to achieve the desired direction of rotation, number of rotations, speed of rotation, and/or maximum speed of rotation of the motor 214. Control screens are used in the below explanations of the cut-stop feature, the blind-cut feature, the wave-cutting feature, and the vibration reduction feature. Each of these control screens is shown as being associated with a single feature. However, in some embodiments, two or more features and corresponding parameters are included on a single control screen to generate a profile having more than one feature. For example, FIG. 14 illustrates a control screen for controlling the cut-stop feature while FIG. 22B illustrates the cut-stop feature as part of the control screen of the custom cut profile.

The plunge cutting feature allows the motor 214 of the power tool 104 to operate at different speeds when material is being cut and may also be referred to as a soft-start feature. In particular, the plunge cutting feature allows the motor 214 to begin operating at a starting speed to catch the material to be cut. After the power tool 104 has begun cutting the material, the motor speed is increased to a finishing speed during a trigger ramp up period. Controlling the motor 214 in this manner helps the power tool 104 cut more efficiently. As shown on the control screen 380 of the GUI in FIGS. 8A and 8B, the plunge cutting feature has parameters that can be adjusted by the user (i.e., using a slider on the GUI or entering a value into a textbox). The parameters of the plunge cutting profile including the plunge cutting feature include the starting speed, the finishing speed, the trigger ramp up period, a work light duration, and a work light brightness. In some embodiments, the parameters of the plunge cutting profile (and other profiles and features) may vary. The power tool 104 receives the plunge cutting profile including the specified parameters, for instance, from the external device 108 as described above.

FIG. 13A illustrates a flowchart of a method 1300 of implementing the plunge cutting feature on the power tool 104. At block 1302, the wireless communication controller 250 receives the plunge cutting profile including parameters of the plunge cutting feature from the external device 108. At block 1305, the electronic processor 230 determines that the trigger 212 has been depressed and starts the motor 214. At block 1310, the electronic processor 230 sets the speed of the motor 214 to the starting speed and starts a timer. At block 1315, the electronic processor 230 determines whether a starting speed time period has elapsed since the user pulled the trigger 212 (e.g., by comparing the timer to the starting speed time period). When the starting speed time period has not yet elapsed since the user pulled the trigger 212, at block 1315, the electronic processor 230 waits until the starting speed time period has elapsed. When the electronic processor 230 determines that the starting speed time period has elapsed, at block 1320, the electronic processor 230 ramps up the motor speed to the finishing speed according to the trigger ramp up period. For example, if the trigger ramp up period is set to "off" (i.e., zero) via control screen 380, the motor speed increases to the finishing speed essentially instantaneously. If, however, the trigger ramp up period is set to a nonzero value (e.g., 0.5 seconds), the motor speed increases to the finishing speed over that nonzero time period. The ramp up may be linear or exponential, for example. Although not shown in FIGS. 8A and 8B, in some embodiments, the starting speed time period may be a user-adjustable parameter on the control screen 380.

FIG. 13B illustrates a flowchart of an alternate method 1350 of implementing the plunge cutting feature on the power tool 104. At block 1352, the wireless communication controller 250 receives the plunge cutting profile including parameters of the plunge cutting feature from the external device 108. At block 1355, the electronic processor 230 determines that the trigger 212 has been depressed and starts the motor 214. At block 1360, the electronic processor 230 sets the speed of the motor 214 to the starting speed and begins monitoring the current drawn by the motor 214. At block 1365, the electronic processor 230 determines whether the motor current exceeds a predetermined catching threshold (i.e., whether the blade 20 has started to catch the material being cut). The electronic processor 230 can monitor the current drawn by the motor 214 using current sensor 218b. When the motor current does not exceed the predetermined catching threshold, at block 1365, the electronic processor 230 waits until the motor current exceeds the predetermined catching threshold. When the electronic processor 230 determines that the motor current exceeds the predetermined catching threshold, at block 1370, the electronic processor 230 ramps up the motor speed to the finishing speed according to the trigger ramp up period. Although not shown in FIGS. 8A and 8B, in some embodiments, the predetermined catching threshold may be a user-adjustable parameter on the control screen 380 to allow the user to adjust the sensitivity that causes a change in motor speed.

Furthermore, in some embodiments of the plunge cutting profile, the electronic processor 230 may monitor rotational acceleration of the rotor and determine that the blade 20 has started to catch the material being cut when the rotational acceleration of the rotor decreases below a predetermined rotational acceleration threshold (e.g., decelerates at a particular level). Additionally, in some embodiments of the plunge cutting profile, the electronic processor 230 may monitor an acceleration of the change in motor current (i.e., the change in the rate of change of motor current over a predetermined time period). In such an embodiment, the electronic processor 230 determines that the blade 20 has started to catch the material being cut when the acceleration of the change in motor current exceeds a motor current acceleration threshold.

As mentioned above, another profile that may be implemented on the power tool 104 is the optimization profile including an optimization feature. When the power tool 104 is operating according to the optimization feature, the electronic processor 230 controls the motor 214 to run at a particular speed regardless of the load experienced by the power tool 104 and regardless of the amount of depression of the trigger 212 (for example, using feedback from the Hall sensors 218a). The particular speed may be an optimal speed determined by the external device 108 based on user input. As mentioned above and as shown in FIG. 12A on the control screen 1200 of the GUI, the optimization profile includes the parameter assist block 1205 for receiving, from the user, one or more of a material type, a thickness of the material, and a model number or type of the blade 20 (e.g., a material that the blade is made out of such as steel and/or a number of blade teeth per unit of length). The control screen 1200 further includes a characteristic selection block 1207 where the user can select a tool characteristic to be optimized (e.g., blade life, power efficiency, speed of job). In response to the external device 108 receiving user inputs in the parameter assist block 1205 and the characteristic selection block 1207, the external device 108 adjusts the motor speed parameter 1210. For example, to maximize the blade life of the blade 20, the electronic processor 330 of the external device 108 may recommend a faster speed when cutting softer material (e.g., mild steel such as angle iron) than when cutting harder material (e.g., stainless steel). As another example, the electronic processor 330 may recommend an even faster speed when cutting an even softer material (e.g., wood). In other words, in some embodiments, the recommended speed increases as the softness of the type of material to be cut increases and vice versa. For example, the electronic processor 330 may recommend a first speed for a first material having a first hardness, a second speed that is less than the first speed for a second material that is harder than the first material, and a third speed that is less than the second speed for a third material that is harder than the second material. The motor speed parameter 1210 can be adjusted by the external device 108 to optimize the characteristic selected by the user in the characteristic selection block 1207. The external device 108 may make such a determination and/or may adjust the motor speed parameter 1210 using a look-up table that includes parameter values corresponding to the user inputs in the parameter assist block 1205 and the characteristic selection block 1207. If desired, the user is able to further adjust the motor speed parameter 1210 (e.g., using a slider on the GUI as shown in FIG. 12A). The power tool 104 receives the optimization profile including the specified parameters, for instance, from the external device 108 as described above.

In some embodiments, the parameter assist block 1205 may not receive a selection of a model number or type of blade 20 that indicates a number of blade teeth per unit of length of the blade along with the selection of the material type and the material thickness. Rather, in some embodiments, the electronic processor 330 of the external device 108 determines a suggested type of the blade 20 based on the parameters received in the parameter assist block 1205 (e.g., the type of material to be cut and thickness of the material to be cut). For example, in some embodiments, the electronic processor 330 of the external device 108 provides recommendations of suggested blade type and suggested motor speed in a layered manner as shown in FIGS. 12B and 12C.

Figure 12C:
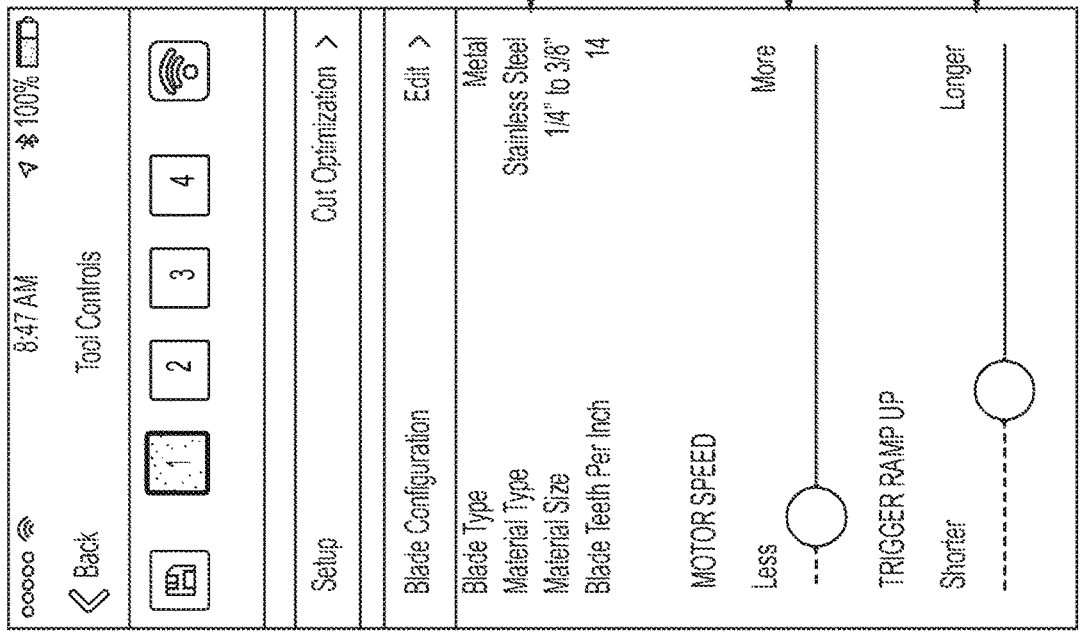
Figure 12B:
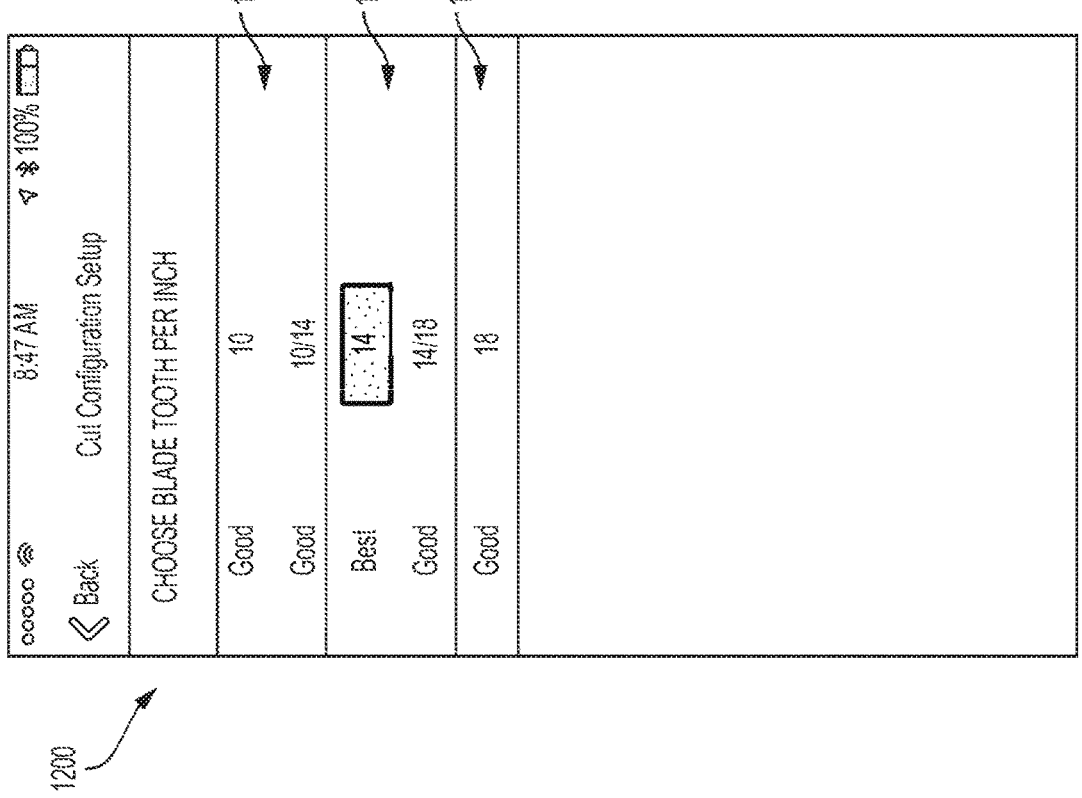

For example, FIG. 12B illustrates a list of recommended types of the blade 20 by blade tooth per inch, which is described in further detail below. FIG. 12C provides another view of the control screen 1200 for the optimization profile having another embodiment of the parameter assist block 1205, illustrated as parameter assist block 1232. The parameter assist block 1232 lists a summary of the selected parameters and includes an edit button that may be selected to modify the various parameters. The parameter assist block 1232 is similar to the parameter assist block 1205, but substitutes the blade model number parameter with blade material and blade teeth per inch parameters.

The parameter assist blocks 1205 and 1232 on the control screen 1200 may receive, from the user, information relating to a material to be cut (e.g., an input of a material type and a thickness of the material). In some embodiments, the parameter assist blocks 1205 and 132 may receive a type of material of the blade (e.g., steel), which may be in place of the model number of the blade in the case of the parameter assist block 1205. Based on at least one of the type of the material to be cut, the thickness of the material to be cut, and the material of the blade, the electronic processor 330 determines a recommended blade type (e.g., a recommended number of teeth per unit of length). In some embodiments, the electronic processor 330 makes such a determination using a look-up table that maps various potential input parameters to a recommended blade type. For example, the electronic processor 330 may recommend a blade with more teeth per unit of length (i.e., smaller teeth) when the material to be cut is thinner than when the material to be cut is thicker. In other words, in some embodiments, the recommended size of the teeth per unit of length decreases as the thickness of the material decreases and vice versa. In some embodiments, the recommended blade type is set such that a predetermined number of teeth of the blade 20 engage the material to be cut at a given time. For example, the recommended blade type may be set such that three teeth of the blade 20 engage the material to be cut at any given time. In such an example, when the material to be cut is one inch thick, the recommended blade type includes three teeth per inch. Further continuing the same example, when the material to be cut is one half of an inch thick, the recommended blade type includes six teeth per inch. In some embodiments, the control screen 1200 may display the recommended blade type and a list of other possible blade types that may be used to cut the material to be cut. For example, as shown in FIG. 12B, the electronic processor 330 controls the control screen 1200 to display the recommended number of blade teeth per unit of length 1215 (labeled "Best" in FIG. 12B). The electronic processor 330 also may control the control screen 1200 to display a list of other recommended options 1220 of numbers of blade teeth per unit of length of blades that may be used to cut the material to be cut (labeled "Good" in FIG. 12B).

Upon receiving an input from the user that selects the number of blade teeth per unit of length of the blade to be used to cut the material, the electronic processor 330 then provides a recommended motor speed based on the blade type selected according to the input on the control screen 1200 (for example, by setting a motor speed parameter 1225 as shown in FIG. 12C or 1210 in FIG. 12A). For example, the electronic processor 330 may recommend a slower speed for a blade with more teeth per unit of length (i.e., smaller teeth) than for a blade with fewer teeth per unit of length (i.e., larger teeth). In other words, in some embodiments, the recommended motor speed decreases when the number of teeth per unit of length of the blade 20 increases and vice versa. Controlling the motor speed according to such a relationship between recommended motor speed and the number of teeth per unit of length of the blade 20 may reduce friction and heat. For example, when operating at the same speed on the same material, a blade with a higher number of teeth per unit of length than another blade with a lower number of teeth per unit of length may produce more friction and heat while cutting a material. Thus, reducing the speed of the blade with a higher number of teeth per unit length may reduce friction and heat generated while cutting the material. Conversely, controlling the motor speed according to the previously explained relationship between recommended motor speed and the number of teeth per unit of length of the blade 20 may reduce movement of the material to be cut while cutting the material. For example, when operating at the same speed on the same material, a blade with a lower number of teeth per unit of length than another blade with a higher number of teeth per unit of length may produce more movement of the material (e.g., the cut may not be as smooth and the larger teeth may get caught on the material). Thus, increasing the speed of the blade with a lower number of teeth per unit of length may reduce movement of the material while cutting the material.

In some embodiments, and with reference to FIG. 12C, the control screen 1200 of the optimization profile may also include a ramp up parameter 1230 similar to that of the plunge cutting profile as described previously herein. In such embodiments, the electronic processor 330 may also provide a recommended ramp up period based on the selected characteristics of the material to be cut and of the blade used to cut the material to be cut that were received on the control screen 1200 as explained previously herein. For example, the electronic processor 330 may recommend a shorter and faster ramp up period for a thinner material to be cut than a thicker material to be cut. In other words, in some embodiments, the recommended ramp up period decreases (i.e., the motor ramps up to the selected motor speed faster) as the thickness of the material to be cut decreases and vice versa. Controlling the ramp up period according to such a relationship between the recommended ramp up period and the thickness of the material allows the power tool 104 to efficiently begin cutting the material to be cut by starting a cut line in the material. In some embodiments, the motor speed parameter 1225 and the ramp up parameter 1230 can be adjusted by the user after the electronic processor 330 provides a recommended parameter value (e.g., using the sliders shown on the control screen 1200 in FIG. 12C).

The cut-stop feature of the power tool 104 turns off the motor 214 (i.e., ceases driving the motor 214) after the electronic processor 230 determines that the power tool 104 has cut through the intended item to be cut. For example, the electronic processor 230 monitors the current drawn by the motor 214 using current sensor 218b to determine when an item is being cut and when the item is no longer being cut. The motor 214 draws more current when cutting through the item than when the motor 214 is not cutting an item. Accordingly, the current drawn by the motor 214 drops after the power tool 104 completes a cut through the item. When this drop in motor current is detected, the electronic processor 230 turns off the motor 214. In some embodiments, the power tool 104 turns off the motor 214 (i.e., ceases driving the motor 214) using active braking, by reducing a PWM duty cycle of the FET switching network 216 to zero (i.e., by no longer providing current to the motor 214), or the like.

As shown in FIG. 14 on a control screen 1405 of the GUI, the user can select whether the power tool 104 implements the cut-stop feature during operation using a toggle on the GUI. The control screen 1405 for the cut-stop feature includes a sensitivity parameter 1410 that controls the current drop required to trigger the electronic processor 230 to turn off the motor 214. For example, the sensitivity parameter 1410 may set a cutting threshold of the motor current that is used to determine when the power tool 104 is cutting an item and when the item is no longer being cut by the power tool 104 (see e.g., blocks 1510 and 1515 of FIG. 15). The sensitivity parameter 1410 can be adjusted by the user using a slider on the GUI. The power tool 104 receives the parameters of the cut-stop feature, for instance, from the external device 108 as part of a profile as described above.

Figure 15:
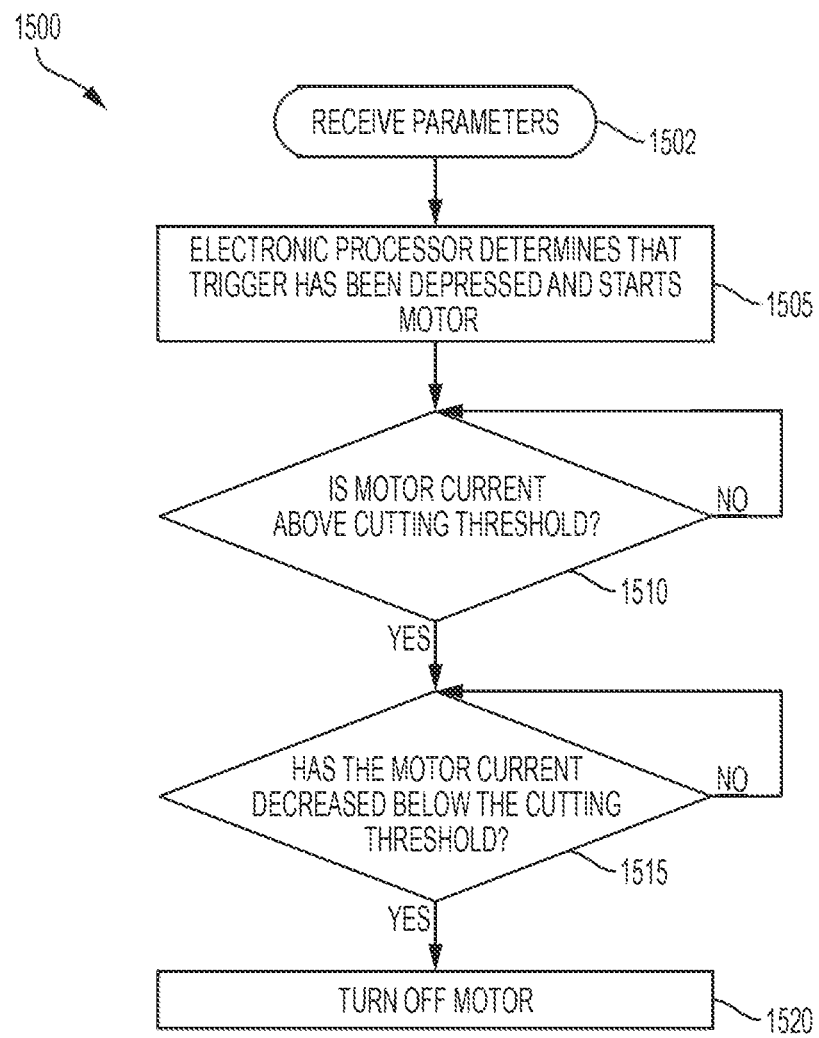
FIG. 15 illustrates a flowchart of an exemplary implementation of a cut-stop feature on the power tool.

FIG. 15 illustrates a flowchart of a method 1500 of implementing the cut-stop feature on the power tool 104. At block 1502, the wireless communication controller 250 receives parameters of the cut-stop feature from the external device 108 (e.g., the cutting threshold and whether to implement the cut-stop feature). At block 1505, the electronic processor 230 determines that the trigger 212 has been depressed and starts the motor 214. At block 1510, the electronic processor 230 monitors the current drawn by the motor 214 to determine whether it is above a cutting threshold (i.e., when the motor current is above the cutting threshold, an item is being cut by the power tool 104). When the motor current is not above the cutting threshold, the electronic processor 230 continues to monitor the motor current. When the motor current is above the cutting threshold, at block 1515, the electronic processor 230 monitors the current drawn by the motor 214 to determine whether it has decreased below the cutting threshold (i.e., when the motor current falls below the cutting threshold, the item is no longer being cut by the power tool 104). As noted previously herein, in some embodiments, the cutting threshold is determined based on the sensitivity parameter 1410 received from the external device 108. When the motor current has not decreased below the cutting threshold, the electronic processor 230 continues to monitor the motor current. When the motor current has decreased below the cutting threshold, at block 1520, the electronic processor 230 turns off the motor 214.

In some embodiments, the cut-stop feature (and other features explained herein) can be implemented across one or more profiles. Alternatively, the cut-stop feature (and other features explained herein) can be implemented in multiple profiles but may be incompatible with other profiles. In such embodiments, the control screen of each feature may have on/off toggles that correspond to the compatibility of the feature in each profile. If the feature is not compatible with a certain profile, the control screen of the selected feature will grey out the on/off toggle of the corresponding profile to indicate that the feature is not compatible with the corresponding profile. Using the on/off toggles on the control screen of each profile, the user can select which features are enabled in a profile. As mentioned above, in some embodiments, the cut stop feature (and other features explained herein) and associated toggles and adjustable parameters are included on each profile control screen in which the feature is compatible. For instance, the cut stop toggle and sensitivity parameter 1410 are included on a control screen 2200b of the custom cut profile shown in FIG. 22B.

Figure 16:
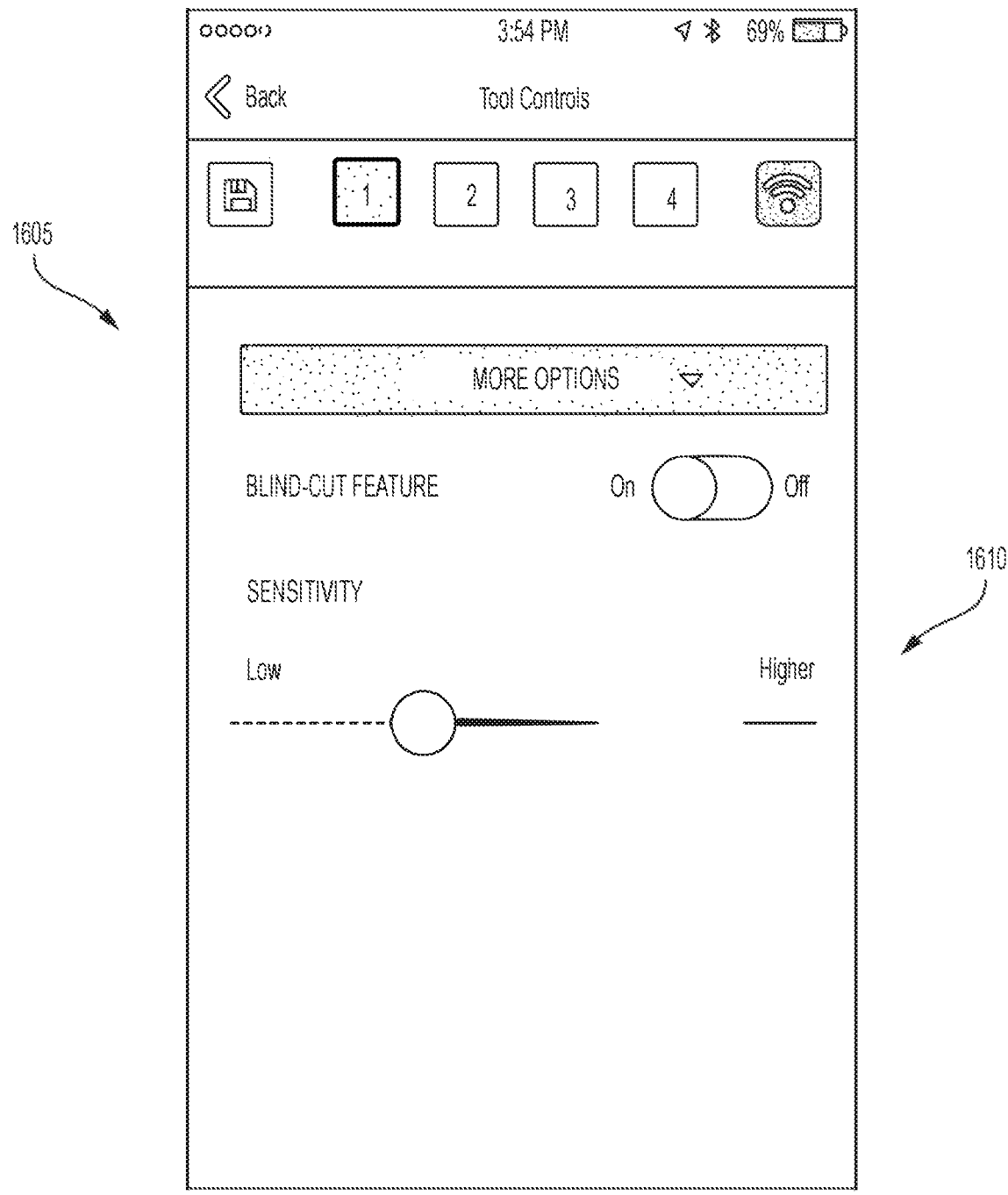
FIG. 16 illustrates a further exemplary screenshot of the user interface of the external device of the communication system.

The blind-cut feature of the power tool 104 turns off the motor 214 when the power tool 104 begins cutting material it was not intended to cut. For example, a user may be cutting through drywall but cannot see what is behind the drywall. In this situation, if the power tool 104 encounters a pipe behind the drywall, the electronic processor 230 turns off the motor 214. The motor 214 draws more current when attempting to cut through a pipe than when cutting through the item intended to be cut (e.g., drywall). The electronic processor 230 monitors the current drawn by the motor 214 using current sensor 218b and determines when the motor current acceleration increases by more than a predetermined rate. Monitoring the acceleration of the change in motor current (i.e., the change in the rate of change of motor current over a predetermined time period) allows the electronic processor 230 to detect current spikes indicative of a change in material being cut. When the motor current acceleration increases by more than the predetermined rate (e.g., because the reciprocating saw blade 20 hit a pipe), the electronic processor 230 turns off the motor 214 (for example, in a manner as described previously herein with respect to the cut-stop feature). As shown in FIG. 16 on a control screen 1605 of the GUI, the user can select whether the power tool 104 implements the blind-cut feature during operation using a toggle on the GUI. Additionally, the blind-cut feature includes a sensitivity parameter 1610 that controls the current acceleration increase threshold used to trigger the electronic processor 230 to turn off the motor 214. For example, the electronic processor 230 may turn off the motor 214 based on a smaller increase in motor current acceleration when the sensitivity parameter 1610 is set to a higher sensitivity than when the sensitivity parameter 1610 is set to a lower sensitivity. The sensitivity parameter 1610 can be adjusted by the user using a slider on the GUI. The power tool 104 receives the parameters of the blind-cut feature, for instance, from the external device 108 as part of a profile as described above.

Figure 17:
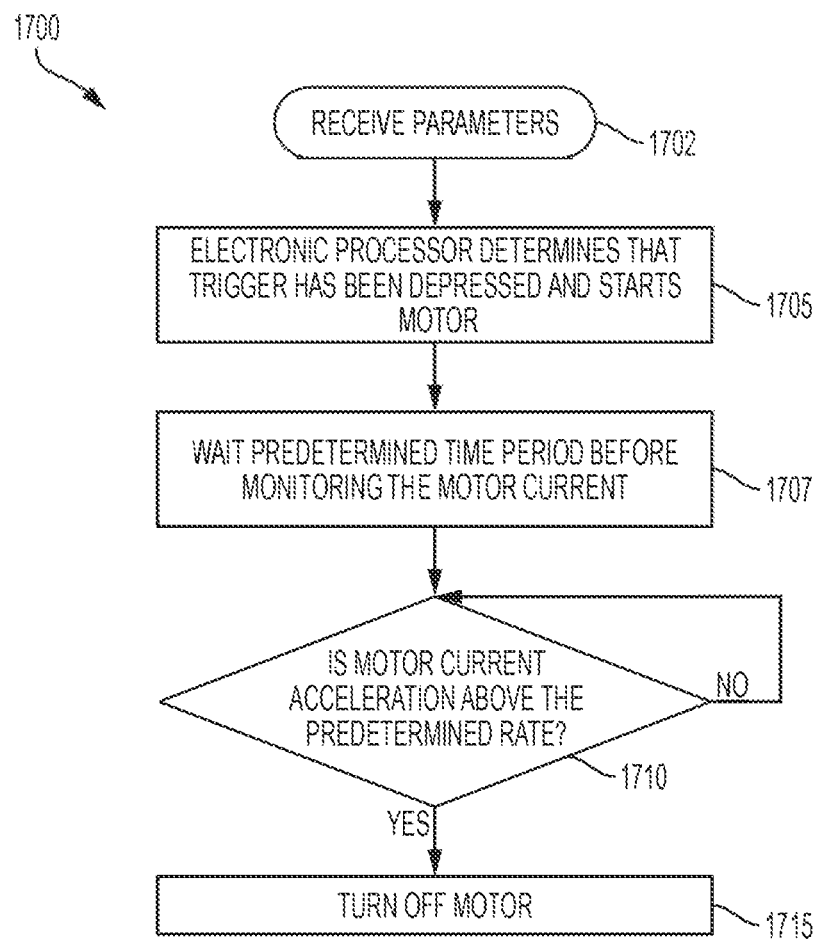
FIG. 17 illustrates a flowchart of an exemplary implementation of a blind-cut feature on the power tool.

FIG. 17 illustrates a flowchart of a method 1700 of implementing the blind-cut feature on the power tool 104. At block 1702, the wireless communication controller 250 receives parameters of the blind-cut feature from the external device 108. At block 1705, the electronic processor 230 determines that the trigger 212 has been depressed and starts the motor 214. At block 1707, the electronic processor 230 waits a predetermined time period (i.e., 500 milliseconds) before beginning to monitor the motor current. The electronic processor 230 does not monitor the motor current during the initial acceleration of the motor 214 because the initial acceleration may be greater than the predetermined rate, which would falsely indicate to the electronic processor 230 that the motor 214 should be turned off. In some embodiments, the electronic processor 230 determines that the power tool 104 has begun cutting an item intended to be cut (i.e., a first material such as drywall) by detecting a first spike in motor current acceleration (e.g., when the motor current acceleration is greater than or equal to a first threshold). After determining that the power tool 104 has begun cutting the item intended to be cut (i.e., while the first material is being cut), the electronic processor 230 monitors motor current to determine whether the power tool 104 has begun cutting an item unintended to be cut (i.e., a second material such as a pipe behind drywall). For example, at block 1710, the electronic processor 230 monitors the current drawn by the motor 214 and determines whether the motor current acceleration is above the predetermined rate set by the sensitivity parameter 1610. When the motor current acceleration is not above the predetermined rate, the method 1700 remains at block 1710 and the electronic processor 230 continues to monitor the current drawn by the motor 214. When the motor current is above the predetermined rate, at block 1715, the electronic processor 230 determines that an item unintended to be cut (i.e., the second material) is being cut and turns off the motor 214.

In addition to the blind-cut feature, in some embodiments, the power tool 104 may be capable of preventing an overcurrent condition of the motor 214. In some embodiments, the electronic processor 230 includes an overcurrent protection threshold that monitors a characteristic of the motor 214 and turns off the motor 214 when the overcurrent protection threshold is reached. For example, the overcurrent protection threshold may be a predetermined time period that allows the electronic processor 230 to detect a locked state of the motor 214 (i.e., that the rotor is no longer rotating even though current is being supplied to the motor 214). In such an example, the electronic processor 230 may determine that the motor 214 is in a locked state when current is being supplied to the motor 214 and none of the Hall sensors 218a detect rotation of the rotor for the predetermined time period (e.g., fifty milliseconds). When such a locked state is detected, the electronic processor 230 turns off the motor 214 (i.e., prevents current from being drawn by the motor 214). As another example, the overcurrent protection threshold may be a predetermined amount of current drawn by the motor 214. In such an example, the electronic processor 230 may turn off the motor 214 when the current drawn by the motor 214 reaches the predetermined amount of current. In some embodiments, the electronic processor 230 may turn off the motor 214 when the current drawn by the motor meets or exceeds the predetermined amount of current for a predetermined time period. In some embodiments, the electronic processor may otherwise utilize an overcurrent protection threshold to turn off the motor 214. In some embodiments, the overcurrent protection threshold cannot be disabled by a user. In some embodiments, when the blind-cut feature of the power tool 104 is enabled, the electronic processor 230 turns off the motor 214 (at block 1715) before the electronic processor 230 determines that the overcurrent protection threshold has been reached. In other words, the threshold selected for the blind-cut feature is selected to be below a level indicative of a motor fault such as a motor stall or the motor 214 exceeding a rated current level of the motor 214.

The wave cutting feature of the power tool 104 assists in cutting in a straight-line. For example, when cutting thin material, the blade 20 tends to take the path of least mechanical resistance, which may cause the blade 20 to veer from cutting in a straight line. By monitoring characteristics of the motor (i.e., speed, current drawn, etc.), the electronic processor 230 can detect a pattern of the characteristic that indicates that the blade 20 is no longer cutting in straight line. A motor speed or current pattern is, for example, a monitored motor speed or current over a certain time period or cycle, such as a cutting stroke. For example, when cutting in a straight line, the monitored motor speed and/or current drawn behaves in a first pattern as the blade 20 cuts through a material. When the blade 20 veers from cutting in a straight line, the monitored motor speed and/or current drawn behaves in a different pattern due to the cut becoming more difficult. Upon detecting this different pattern in motor speed and/or current drawn, the electronic processor 230 reduces the speed of the motor 214 to allow the blade 20 to catch the material to be cut and begin cutting in a straight line again. When the blade 20 catches the material and begins cutting in a straight line again, the electronic processor 230 can allow the motor speed to increase from the reduced speed. The electronic processor 230 can determine that the blade 20 is cutting in a straight line again by recognizing that the behavior of the monitored motor speed and/or current drawn has been restored to the first pattern.

Figure 18:
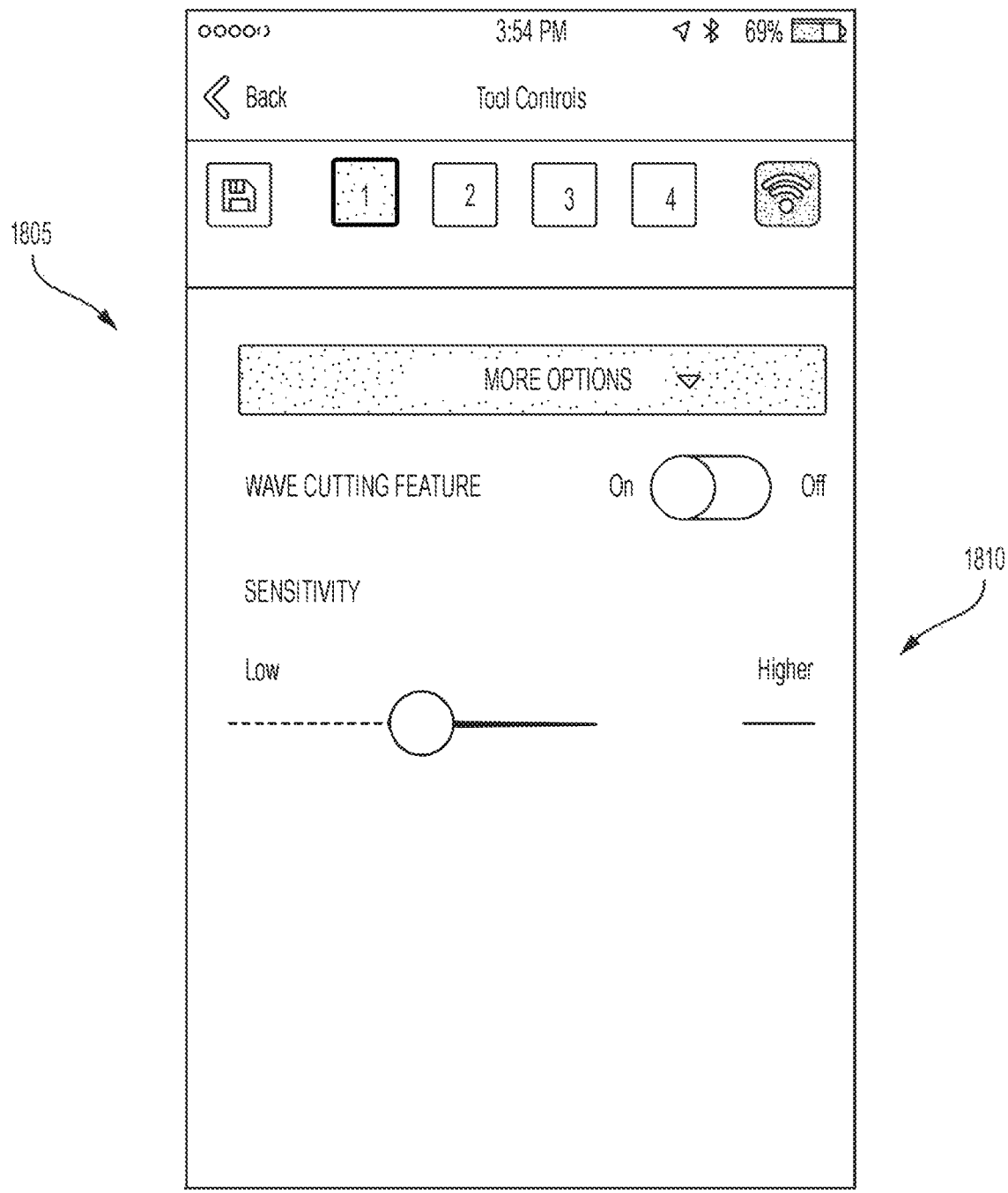
FIG. 18 illustrates a further exemplary screenshot of the user interface of the external device of the communication system.

As shown in FIG. 18 on a control screen 1805 of the GUI, the user can select whether the power tool 104 implements the wave cutting feature during operation using a toggle on the GUI. Additionally, the wave cutting feature includes a sensitivity parameter 1810 that controls the sensitivity used to trigger the electronic processor 230 to reduce the speed of the motor 214. In other words, the sensitivity parameter 1810 controls the difference between the monitored pattern and the first pattern of motor speed and/or current drawn before the electronic processor 230 implements one or more of the correction methods explained below. The sensitivity parameter 1810 can be adjusted by the user using a slider on the GUI. The power tool 104 receives the parameters of the wave cutting feature, for instance, from the external device 108 as part of a profile as described above.

Figure 19:
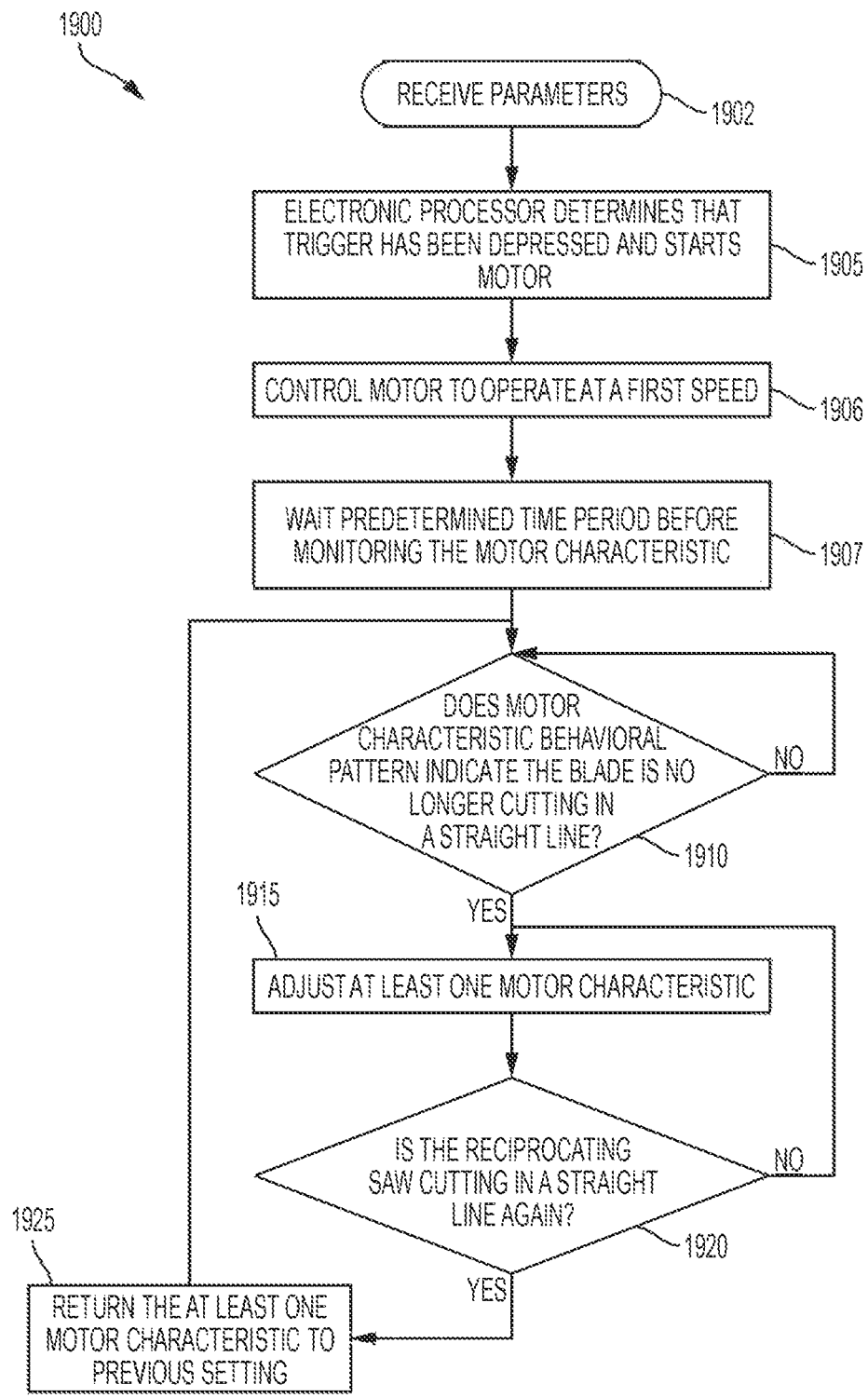
FIG. 19 illustrates a flowchart of an exemplary implementation of a wave cutting feature on the power tool.

FIG. 19 illustrates a flowchart of a method 1900 of implementing the wave cutting feature on the power tool 104. At block 1902, the wireless communication controller 250 receives parameters of the wave cutting feature from the external device 108. At block 1905, the electronic processor 230 determines that the trigger 212 has been depressed and starts the motor 214. At block 1906, the electronic processor 230 controls the motor 214 to operate at a first speed, based on the depression of the trigger 212, to cut desired material. At block 1907, the electronic processor 230 waits a predetermined time period (i.e., 500 milliseconds) before beginning to monitor a motor characteristic (e.g., motor speed and/or current drawn). The electronic processor 230 does not monitor the motor characteristic during the initial acceleration of the motor 214 because the initial acceleration of the motor (i.e., the motor acceleration from when the motor 214 is initially turned on until the motor 214 reaches the first speed) may falsely indicate to the electronic processor 230 that the motor speed should be reduced.

At block 1910, the electronic processor 230 monitors the motor characteristic and determines whether the behavior of the motor characteristic is a pattern that indicates the blade is no longer cutting in a straight line. When the motor characteristic behavioral pattern indicates that the blade 20 is cutting in a straight line, the method 1900 remains at block 1910 and the electronic processor 230 continues to monitor the motor characteristic. When the motor characteristic behavioral pattern indicates that the blade 20 is not cutting in a straight line, at block 1915, the electronic processor 230 adjusts at least one characteristic of the motor 214 to restore the blade 20 to cut in a straight line again. For example, the electronic processor 230 may reduce the speed of the motor 214 to allow the blade 20 to catch the material to be cut.

At block 1920, the electronic processor 230 determines whether the blade 20 has resumed cutting in an approximately straight line (e.g., by monitoring the motor characteristic behavioral pattern to determine whether the pattern indicates a straight-line cut). When the electronic processor 230 determines that the blade 20 is not cutting in a straight line, the method 1900 proceeds to block 1915 to further adjust at least one motor characteristic to restore the blade 20 to cut in a straight line. When the electronic processor 230 determines that the blade 20 is cutting in a straight line again, at block 1925, the electronic processor 230 returns the at least one motor characteristic to its previous setting (i.e., the setting of the at least one motor characteristic before the electronic processor 230 determined that the blade 20 was no longer cutting in a straight line). The method 1900 then proceeds back to block 1910 to continue to monitor the motor characteristic. For example, in the case of the electronic processor 230 reducing the speed of the motor 214 from the first speed in block 1915, the electronic processor 230 may return the motor to the first speed in block 1925. In some embodiments, in block 1925, the electronic processor 230 may adjust the at least one motor characteristic, but to a setting other than its previous setting.

Alternatively, in some embodiments, a combination of an accelerometer and a gyroscope may be used to determine when the blade 20 is no longer cutting in a straight line. For example, the accelerometer can determine an orientation of the power tool 104 relative to gravity. The gyroscope can be used to determine an initial direction in which the power tool 104 begins to cut. The electronic processor 230 monitors the accelerometer and/or the gyroscope to determine when the power tool 104 rotates from the initial direction, which indicates that the blade 20 is no longer cutting in a straight line (block 1910). After adjusting a characteristic of the motor 214 (block 1915), the gyroscope can also be used to detect that the blade 20 has been restored to cutting in a straight line (block 1920).

As explained above, at block 1915, the electronic processor 230 adjusts at least one characteristic of the motor 214 to restore the blade 20 to cut in a straight line. Alternatively or in addition to reducing the speed of the motor 214 to allow the blade 20 to cut in a straight line again, the electronic processor 230 may adjust the speed of the motor 214 in another manner. Furthermore, the electronic processor 230 may adjust a length of a forward and/or reverse stroke of the blade 20 and/or may adjust a speed of the forward and/or reverse stroke of the blade 20. Additionally, the electronic processor 230 may adjust a blade angle of the blade 20 by rotating the blade clamp 21 about the longitudinal axis A (see FIG. 2).

The rotation of the blade clamp 21 may be accomplished in numerous ways by the electronic processor 230 controlling a blade clamp drive 272 (see FIG. 3A). In some embodiments, the blade clamp drive 272 is a secondary motor coupled to the blade clamp 21 that rotates the blade clamp 21 in either direction about the longitudinal axis A. In some of these embodiments, the secondary motor may rotate the blade clamp 21 up to five degrees in either direction. For example, the electronic processor 230 determines which direction to rotate the blade clamp 21 and an amount of rotation based on signals received from the accelerometer and/or gyroscope. In other embodiments, the blade clamp 21 may be coupled to the main body 14 of the power tool 104 through the reciprocating spindle 18 using a reservoir of magnetically-susceptible fluid. In such embodiments, the blade clamp drive 272 is an inductor that produces a magnetic field that affects the viscosity of the magnetically-susceptible fluid. For example, the magnetically-susceptible fluid can be activated to be more rigid and more viscous when the blade 20 is cutting in a straight line. When the blade 20 begins to veer from the straight line (e.g., as detected in block 1910), the electronic processor 230 controls the magnetically-susceptible fluid to be less rigid and less viscous. When the magnetically-susceptible fluid is less rigid and less viscous, the blade 20 is allowed to rotate about the longitudinal axis A, which enables the blade 20 to cut in a straight line again. Once the electronic processor 230 determines that the blade 20 is cutting in a straight line again (block 1920), the electronic processor 230 can readjust the magnetically-susceptible to be more rigid and more viscous. In some embodiments, the blade clamp 21 may be allowed to rotate up to five degrees in either direction.

Figure 20:
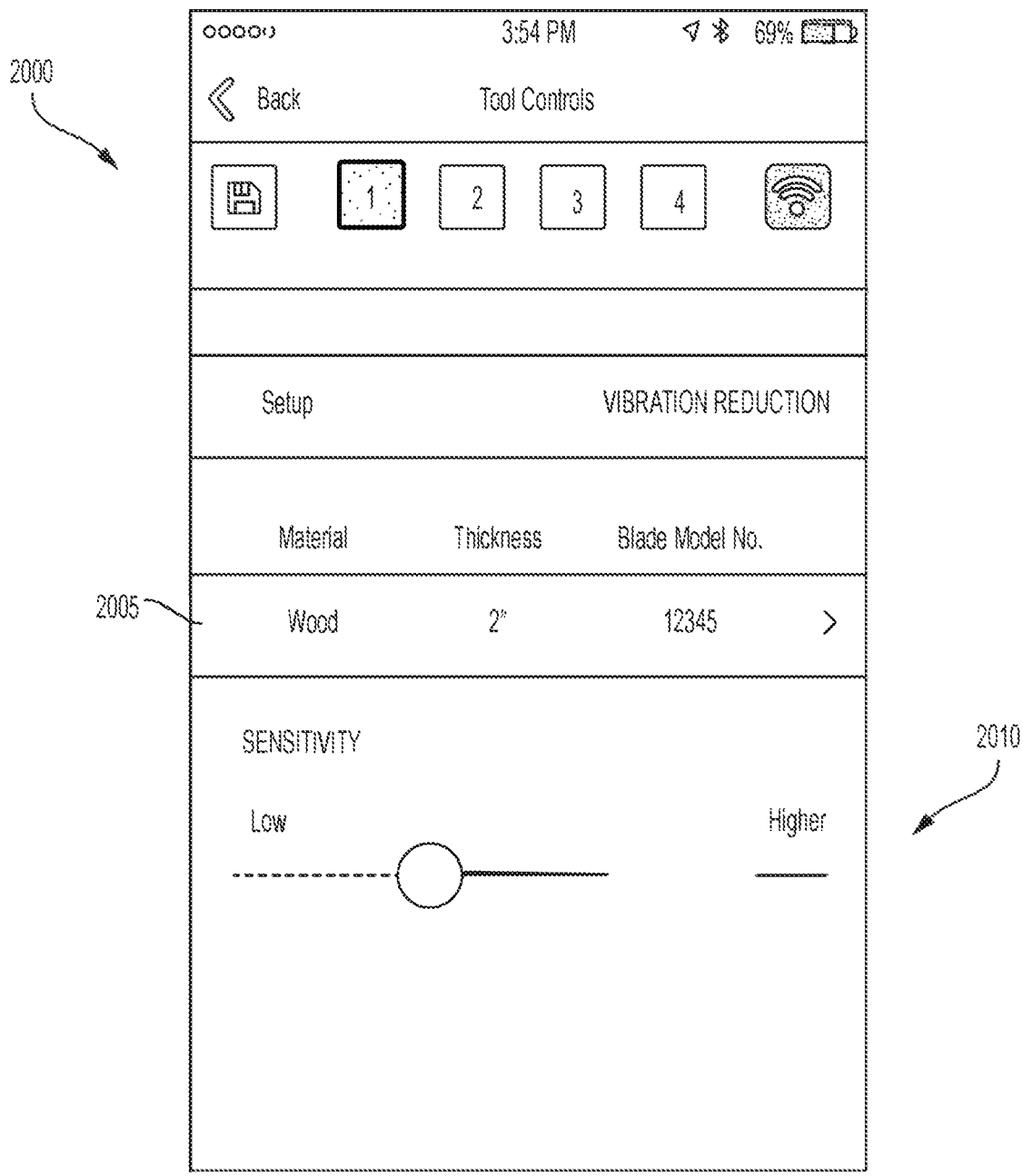
FIG. 20 illustrates a further exemplary screenshot of the user interface of the external device of the communication system.

The vibration reduction feature reduces vibration during operation of the power tool 104. Sensors 218 on the power tool 104 sense numerous conditions of the power tool 104 during operation. For example, vibration sensor 218*c* may be an accelerometer that can determine the vibration experienced by the blade 20. The distance sensor 218*d* is a sensor that determines the distance between the material being cut and the shoe 30. Additionally, the shoe contact sensor 218*e* is a sensor that determines whether material is contacting the shoe 30. In some embodiments, the distance sensor 218*d* and the shoe contact sensor 218*e* may be a single sensor. The distance sensor 218*d* and the shoe contact sensor 218*e* may be induction sensors, radar sensors, ultrasonic sensors, and/or capacitive sensors. Similar to the optimization profile control screen 1200 discussed above, the vibration reduction control screen 2000 includes a parameter assist block 2005, as shown in FIG. 20. The parameter assist block 2005 includes work factor inputs that allow a user to specify the material being cut, the thickness of the material being cut, and the model number or type of the blade 20. The external device 108 may adjust parameters of the vibration reduction feature using a look-up table that includes parameter values corresponding to the user inputs in the parameter assist block 2005. The vibration reduction control screen 2000 also includes a sensitivity parameter 2010 that controls the sensitivity of the vibration reduction feature (i.e., the amount of vibration control can be adjusted). For example, the electronic processor 230 may implement one or more of the vibration reduction methods explained below based on a smaller detected amount of vibration of the power tool 104 when the sensitivity parameter 2010 is set to a higher sensitivity than when the sensitivity parameter 2010 is set to a lower sensitivity. The sensitivity parameter 2010 can be adjusted by the user using a slider on the GUI. The power tool 104 receives the parameters of the vibration reduction feature, for instance, from the external device 108 as part of a profile as described above.

Based on feedback from one or more of the sensors 218 and the parameters provided by the user in the parameter assist block 2005, the electronic processor 230 can adjust at least one characteristic of the motor 214 to reduce vibration. For example, the electronic processor 230 may adjust forward or reverse stroke length of the blade 20, change the orbit of the blade 20, and/or provide additional current to the motor 214. Adjusting the forward or reverse stroke length of the blade 20 may increase or decrease a pull stroke of the power tool 104 to reduce vibration. Additionally, changing the orbit of the blade 20 allows for a more aggressive cut by increasing the distance that the blade 20 moves in a direction perpendicular to a cutting direction. Accordingly, if a tough material is causing vibration, changing the orbit of the blade 20 may reduce vibration. Furthermore, providing additional current to the motor 214 may help the blade 20 cut through tough parts of the material being cut (e.g., knots in wood), which may causing an increase in vibration.

Figure 21:
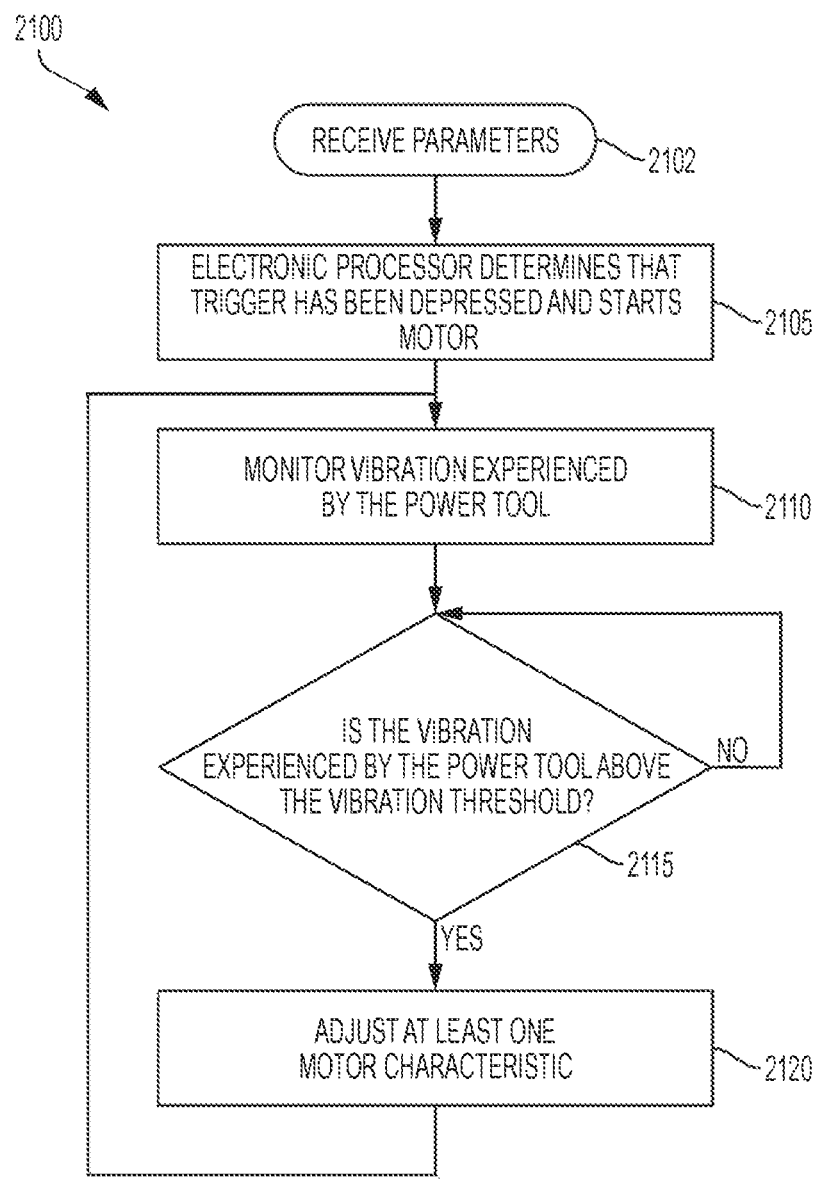
FIG. 21 illustrates a flowchart of an exemplary implementation of a vibration reduction feature on the power tool.

FIG. 21 illustrates a flowchart of a method 2100 of implementing the vibration reduction feature on the power tool 104. At block 2102, the wireless communication controller 250 receives parameters of the vibration reduction feature from the external device 108. At block 2105, the electronic processor 230 determines that the trigger 212 has been depressed and starts the motor 214. At block 2110, the electronic processor 230 monitors the vibration experienced by the power tool (i.e., by reading vibration sensor 218*c*). At block 2115, the electronic processor 230 determines whether the vibration experienced by the power tool 104 is above a vibration threshold (for example, set by the sensitivity parameter 2010). When the vibration experienced by the power tool 104 is not above the vibration threshold, the method 2100 remains at block 2115 and continues monitoring the vibration experienced by the power tool 104. When the vibration experienced by the power tool 104 is above the vibration threshold, at block 2120, the electronic processor 230 adjusts at least one characteristic of the motor 214 to reduce the vibration experienced by the power tool 104. Examples of motor characteristics that may be adjusted are explained above and include the forward or reverse stroke length of the blade 20, the orbit of the blade 20, and/or the current provided to the motor 214. The method 2100 then proceeds back to block 2110 to continue monitoring the vibration experienced by the power tool 104.

The custom cut profile allows the user to customize operation of the power tool 104 using one or more of the parameters and/or features described above. For example, as shown in FIGS. 22A and 22B on a control screen 2200*a* and 2200*b* of the GUI, the user can select numerous parameters that control the operation of the power tool 104. The user can choose whether to operate the motor 214 at a first set speed (i.e., speed one) by toggling a corresponding on/off toggle of speed one parameter 2205 on the GUI. The user can also choose whether to operate the motor at a second set speed (i.e., speed two) by toggling a corresponding on/off toggle of speed two parameter 2210 on the GUI. The first set speed and the second set speed can be adjusted using respective sliders of the speed one parameter 2205 and the speed two parameter 2210 as shown on the GUI in FIG. 22A.

Thus, the user can choose to operate the power tool 104 at a constant speed by only setting speed one of the custom cut mode. Alternatively, by setting both speed one and speed two, the user can choose to operate the power tool 104 such that it changes speeds during operation. If the power tool 104 is chosen to operate to change speeds during operation, the user can also select which characteristic of the power tool 104 causes the speed change using speed change parameters 2215. For example, the user can choose whether the motor 214 changes from speed one to speed two based on time or based on current. Using the slider of the speed change parameters 2215, the user can further set the length of time or the motor current change (i.e., a threshold) required to cause the motor speed to change. The user can also adjust the trigger ramp up period (i.e., the time that elapses between the motor 214 changing from speed one to speed two) using the slider of the trigger ramp up parameter 2220. Furthermore, using the toggle and slider of cut-stop feature parameters 2225, the user can choose whether to enable the cut-stop feature as described above.

Accordingly, the custom cut profile allows the user to customize operation of the power tool 104. In some embodiments, more or fewer parameters are available for the user to choose from on the GUI of the custom cut profile. For example, in some embodiments the user may be able to set a third speed of the motor 214. Additionally, if the user does not enable more than one speed on the control screen 2200, the speed change parameters 2215 and trigger ramp up parameter 2220 become greyed-out and cannot be set by the user because they are not applicable. The power tool 104 receives the customized parameters of the custom cut profile, for instance, from the external device 108 as described above.

When the power tool 104 is operating using the profiles and/or features described above, if the electronic processor 230 determines that the trigger 212 is no longer depressed, the electronic processor 230 turns off the motor 214 (for example, in a manner as described previously herein with respect to the cut-stop feature). Accordingly, the methods shown in the flowcharts of FIGS. 13A, 13B, 15, 17, 19, and 21 can be ended and the motor 214 stopped at any block in the flowcharts when the electronic processor 230 determines that the trigger 212 is no longer depressed.

Figure 23:
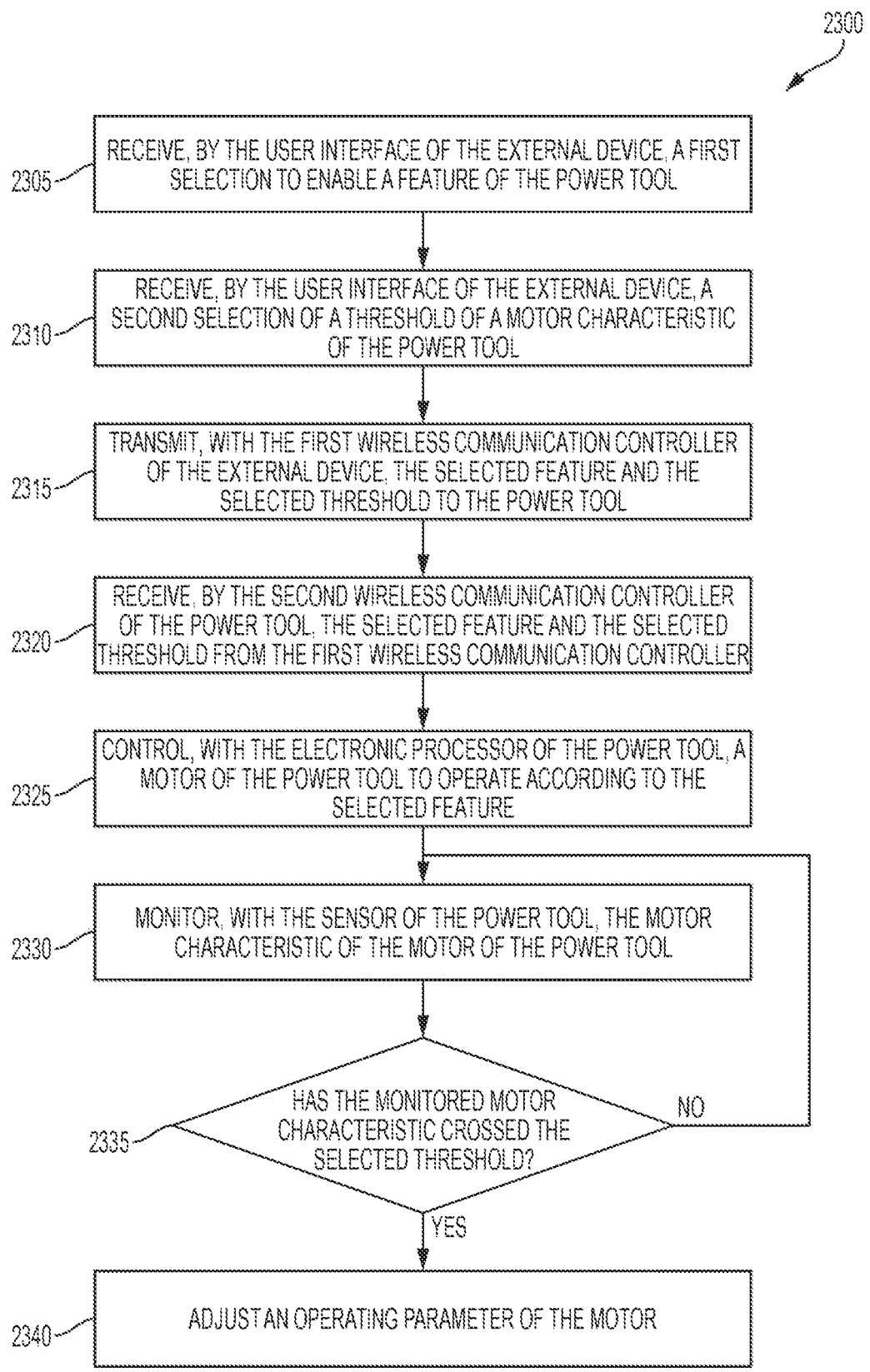
FIG. 23 illustrates a flowchart of an exemplary generic implementation of multiple features of the power tool.

FIG. 23 illustrates a flowchart of a generic method 2300 that may be used to control the power tool 104 in accordance with at least one of the features of the power tool 104 described previously herein. For example, the method 2300 can be implemented with respect to at least some embodiments of the plunge cutting feature, the cut-stop feature, the blind-cut feature, and the wave cutting feature. At block 2305, the user interface of the external device 108 (e.g., at least one of control screens 380, 1405, 1605, and 1805) receives a first selection to enable a feature of the power tool 104. For example, the on/off toggles shown in FIGS. 14, 16, and 18 may be used to receive the first selection as described previously herein. At block 2310, the user interface of the external device (108) receives a second selection of a threshold of a motor characteristic of the power tool 104. For example, the threshold of the motor characteristic can be selected on the sliders corresponding to the sensitivity parameters 1410, 1610, and 1810 shown in FIGS. 14, 16, and 18 as described previously herein.

At block 2315, the wireless communication controller 334 of the external device 108 (i.e., the first wireless communication controller) transmits the selected feature and the selected threshold to the power tool 104 as described previously herein. At block 2320, the wireless communication controller 250 of the power tool 104 (i.e., a second wireless communication controller) receives the selected feature and the selected threshold from the wireless communication controller 334 of the external device 108. In other words, the power tool 104 receives parameters from the external device 108 as previously described with respect to block 1352 of FIG. 13B, block 1502 of FIG. 15, block 1702 of FIG. 17, and block 1902 of FIG. 19.

At block 2325, the electronic processor 230 of the power tool 104 controls the motor 214 of the power tool 104 to operate according to the selected feature. For example, when implementing the plunge cutting feature, the electronic processor 230 sets the speed of the motor 214 to the starting speed (as explained previously with respect to block 1360 of FIG. 13B). When implementing the cut-stop feature, the blind-cut feature, or the wave cutting feature, the electronic processor 230 determines that trigger 212 has been depressed and starts the motor 214 (as explained previously with respect to block 1505 of FIG. 15, block 1705 of FIG. 17, and block 1905 of FIG. 19).

At block 2330, a sensor (e.g., the current sensor 218*b*) of the power tool 104 monitors a motor characteristic of the motor 214 (e.g., a current drawn by the motor 214) and provides a signal indicative of the motor characteristic to the electronic processor 230 as described previously herein. At block 2335, the electronic processor 230 determines whether the monitored motor characteristic has crossed the selected threshold previously received from the external device 108. For example, when implementing the plunge cutting feature, the electronic processor 230 may monitor motor current to determine whether the motor current exceeds the selected threshold (e.g., a catching threshold as explained previously herein with respect to block 1365 of FIG. 13B). When implementing the cut-stop feature, the electronic processor 230 may monitor motor current to determine whether the motor current has decreased below the selected threshold (e.g., a cutting threshold as explained previously herein with respect to block 1515 of FIG. 15). When implementing the blind-cut feature, the electronic processor 230 may monitor motor current to determine whether the motor current acceleration is above the selected threshold (e.g., a predetermined motor current acceleration rate as explained previously herein with respect to block 1710 of FIG. 17). When implementing the wave cutting feature, the electronic processor 230 may monitor motor current to determine whether a behavioral pattern of the motor current crosses the selected threshold (e.g., to indicate that the blade 20 is no longer cutting in a straight line as explained previously herein with respect to block 1910 of FIG. 19).

When the electronic processor 230 determines that the monitored motor characteristic has not crossed the selected threshold, the method 2300 proceeds back to block 2330 and the electronic processor 230 continues to monitor the motor characteristic. When the electronic processor 230 determines that the monitored motor characteristic has crossed the selected threshold, at block 2340, the electronic processor 230 adjusts an operating parameter of the motor 214. For example, when implementing the plunge cutting feature, the electronic processor 230 may ramp up the speed of the motor 214 to the finishing speed as explained previously herein with respect to block 1370 of FIG. 13B. When implementing the cut-stop feature or the blind-cut feature, the electronic processor 230 may turn off the motor 214 as explained previously herein with respect to block 1520 of FIG. 15 and block 1715 of FIG. 17. When implementing the wave cutting feature, the electronic processor 230 may adjust at least one of a speed of the motor, a length of a forward stroke of the blade, a length of a reverse stroke of the blade, and a blade angle of the blade as explained previously herein with respect to block 1915 of FIG. 19.

As described previously herein with respect to the methods shown in the flowcharts of FIGS. 13A, 13B, 15, 17, 19, and 21, when the power tool 104 is executing the method 2300 described above, if the electronic processor 230 determines that the trigger 212 is no longer depressed, the electronic processor 230 turns off the motor 214. Accordingly, the method 2300 can be ended and the motor 214 stopped at any block in the flowcharts when the electronic processor 230 determines that the trigger 212 is no longer depressed.

Thus, the invention provides, among other things, a power tool, such as a reciprocating saw, that communicates with an external device for configuring the power tool and obtaining data from the power tool. Various features and advantages of the invention are set forth in the following claims.

We claim:

1. A method of controlling operation of a power saw including a saw blade, the method comprising:
receiving, with a wireless communication controller of the power saw and from an external device, a selected first speed, a selected second speed, a selected characteristic to be monitored to cause a speed change of a motor of the power saw during operation of the motor, and a selected threshold, wherein each of the selected first speed, the selected second speed, the selected characteristic to be monitored, and the selected threshold was selected via a user input on the external device, the power saw including:
a housing,
the motor within the housing, wherein the motor includes a rotor and a stator,
a transmission coupled between the motor and a spindle, wherein the transmission converts rotational motion of the motor to motion of the spindle, and
the saw blade coupled to the spindle;
controlling, with an electronic processor of the power saw, the motor of the power saw to operate in a first stage of operation based on the selected first speed in response to determining that a trigger of the power saw has been actuated;
determining, with the electronic processor and based on information received from a sensor of the power saw that is configured to monitor the selected characteristic to be monitored, whether the selected characteristic to be monitored has reached the selected threshold; and
controlling, with the electronic processor, the motor to operate in a second stage of operation based on the selected second speed in response to determining that the selected characteristic to be monitored has reached the selected threshold.

2. The method of claim 1, wherein:
controlling the motor to operate in the first stage of operation includes:
controlling, with the electronic processor, a speed of the motor to vary based on an amount of actuation of the trigger during the first stage of operation,
controlling, with the electronic processor, a maximum speed of the motor during the first stage of operation to be the selected first speed; and
controlling the motor to operate in the second stage of operation includes:
controlling, with the electronic processor, the speed of the motor to vary based on the amount of actuation of the trigger during the second stage of operation, and
controlling, with the electronic processor, the maximum speed of the motor during the second stage of operation to be the selected second speed.

3. The method of claim 1, wherein:
controlling the motor to operate in the first stage of operation includes controlling, with the electronic processor, the motor to operate at the selected first speed during the first stage of operation; and
controlling the motor to operate in the second stage of operation includes controlling, with the electronic processor, the motor to operate at the selected second speed during the second stage of operation.

4. The method of claim 3, further comprising:
receiving, with the wireless communication controller and from the external device, a selected ramp up period that controls a rate at which a motor speed is changed from the selected first speed to the selected second speed, wherein the selected ramp up period was selected via a second user input on the external device; and
controlling, with the electronic processor, the motor speed to change from the selected first speed to the selected second speed according to the selected ramp up period.

5. The method of claim 1, wherein the selected second speed is higher than the selected first speed.

6. The method of claim 1, wherein the selected characteristic to be monitored includes an amount of time elapsed since the motor has been started and the sensor includes a timer that monitors the amount of time elapsed since the motor has been started.

7. The method of claim 1, wherein the selected characteristic to be monitored includes a motor current and the sensor includes a current sensor that monitors the motor current.

8. A power saw including a saw blade, the power saw comprising:
a housing;
a motor within the housing, wherein the motor includes a rotor and a stator;
a transmission coupled between the motor and a spindle, wherein the transmission converts rotational motion of the motor to motion of the spindle;
the saw blade coupled to the spindle;
a wireless communication controller configured to receive, from an external device, a selected first speed, a selected second speed, a selected characteristic to be monitored to cause a speed change of the motor during operation of the motor, and a selected threshold, wherein each of the selected first speed, the selected second speed, the selected characteristic to be monitored, and the selected threshold was selected via a user input on the external device;

a sensor configured to monitor the selected characteristic to be monitored; and an electronic processor coupled to the sensor and to the wireless communication controller, wherein the electronic processor is configured to:

control the motor to operate in a first stage of operation based on the selected first speed in response to determining that a trigger of the power saw has been depressed, determine whether the selected characteristic to be monitored has crossed the selected threshold, and control the motor to operate in a second stage of operation based on the selected second speed in response to determining that the selected characteristic to be monitored has crossed the selected threshold.

9. The power saw of claim 8, wherein the electronic processor is configured to:

control a speed of the motor to vary based on an amount of actuation of the trigger during the first stage of operation;

control a maximum speed of the motor during the first stage of operation to be the selected first speed;

control the speed of the motor to vary based on the amount of actuation of the trigger during the second stage of operation; and control the maximum speed of the motor during the second stage of operation to be the selected second speed.

10. The power saw of claim 8, wherein the electronic processor is configured to:

control the motor to operate at the selected first speed during the first stage of operation, control the motor to operate at the selected second speed during the second stage of operation.

11. The power saw of claim 10, wherein:

the wireless communication controller is configured to receive, from the external device, a selected ramp up period that controls a rate at which a motor speed is changed from the selected first speed to the selected second speed, wherein the selected ramp up period was selected via a second user input on the external device; and the electronic processor is configured to change the motor speed from the selected first speed to the selected second speed according to the selected ramp up period.

12. The power saw of claim 8, wherein the selected second speed is higher than the selected first speed.

13. The power saw of claim 8, wherein the selected characteristic to be monitored includes an amount of time elapsed since the motor has been started and the sensor includes a timer that monitors the amount of time elapsed since the motor has been started.

14. The power saw of claim 8, wherein the selected characteristic to be monitored includes a motor current and the sensor includes a current sensor that monitors the motor current.

* * * * *